United States Patent
Kubota et al.

(10) Patent No.: US 9,648,413 B2
(45) Date of Patent: May 9, 2017

(54) LOUDSPEAKER SYSTEM

(71) Applicant: TOA Corporation, Hyogo (JP)

(72) Inventors: Hiroshi Kubota, Hyogo (JP); Satoshi Miyata, Hyogo (JP)

(73) Assignee: TOA Corporation, Hyogo (JP)

( * ) Notice: Subject to any disclaimer, the term of this patent is extended or adjusted under 35 U.S.C. 154(b) by 0 days.

(21) Appl. No.: 14/765,364

(22) PCT Filed: Feb. 5, 2013

(86) PCT No.: PCT/JP2013/052583
§ 371 (c)(1),
(2) Date: Aug. 3, 2015

(87) PCT Pub. No.: WO2014/122723
PCT Pub. Date: Aug. 14, 2014

(65) Prior Publication Data
US 2015/0373452 A1 Dec. 24, 2015

(51) Int. Cl.
*H04R 1/40* (2006.01)
*H04R 3/12* (2006.01)
(Continued)

(52) U.S. Cl.
CPC ............ *H04R 1/323* (2013.01); *G06F 3/165* (2013.01); *H04R 1/403* (2013.01); *H04R 3/12* (2013.01);
(Continued)

(58) Field of Classification Search
CPC . H04R 1/33; H04R 1/403; H04R 3/12; H04R 5/04; G06F 3/165
See application file for complete search history.

(56) References Cited

U.S. PATENT DOCUMENTS

2004/0105555 A1* 6/2004 Stromme ............... G08C 17/02 381/56
2009/0185033 A1* 7/2009 Nozaki .............. H04N 5/23219 348/77
(Continued)

FOREIGN PATENT DOCUMENTS

JP H08221081 8/1996
JP 2001025084 1/2001
(Continued)

OTHER PUBLICATIONS

International Search Report issued in corresponding International Patent Application No. PCT/JP2013/052583, dated Mar. 12, 2013 (1 page).

*Primary Examiner* — Sonia Gay
(74) *Attorney, Agent, or Firm* — Kilyk & Bowersox, P.L.L.C.

(57) ABSTRACT

Provided is a loudspeaker system capable of easily determining control parameters for controlling the directional characteristics of a speaker set including two or more speaker units. The loudspeaker system is configured to include: a speaker set 11 including two or more speaker units 2; a camera 15 adapted to photograph an acoustic space of the speaker set 11; a monitor 22 adapted to display a camera image 30 photographed by the camera 15; and a directional control parameter generating part 24 adapted to generate directional control parameters providing the directional characteristics of the speaker set 11. The directional control parameter generating parts 24 includes: a target position designation part 101 adapted to, on the basis of user operations, designate target positions 32 on the camera image 30; a directional control angle calculation part 103 adapted to, on the basis of the target positions 32, obtain directional control angles θ with respect to a front direction of the speaker set 11; and a directional control parameter determi- (Continued)

nation part 104 adapted to, on the basis of the directional control angles θ, determine the directional control parameters.

17 Claims, 18 Drawing Sheets

(51) Int. Cl.
  *G06F 3/16* (2006.01)
  *H04S 7/00* (2006.01)
  *H04R 1/32* (2006.01)
  *H04R 5/04* (2006.01)
(52) U.S. Cl.
  CPC ......... *H04R 5/04* (2013.01); *H04R 2201/401* (2013.01); *H04R 2201/405* (2013.01); *H04R 2203/12* (2013.01); *H04S 7/302* (2013.01)

(56) References Cited

U.S. PATENT DOCUMENTS

| | | | |
|---|---|---|---|
| 2011/0316996 A1* | 12/2011 | Abe | H04S 7/303 348/77 |
| 2012/0113224 A1* | 5/2012 | Nguyen | G06T 7/0065 348/46 |

FOREIGN PATENT DOCUMENTS

| | | |
|---|---|---|
| JP | 2007-25380 A | 2/2007 |
| JP | 2009-111833 A | 5/2009 |
| JP | 2010-154110 A | 7/2010 |

* cited by examiner (a) A-A CROSS-SECTIONAL VIEW (b) B-B CROSS-SECTIONAL VIEW

LOUDSPEAKER SYSTEM

This application is a National Stage Application of PCT/JP2013/052583, filed Feb. 5, 2013.

TECHNICAL FIELD

The present invention relates to a loudspeaker system, and more specifically, to improvement of a loudspeaker system adapted to perform directional control of a speaker set including two or more speaker units.

BACKGROUND ART

Conventional speaker apparatuses include one that is disposed with multiple speaker units driven by a common acoustic signal in the same housing, includes multiple phase adjustment circuits, which are related to the speaker units, and can control the directional characteristics of the speaker apparatus by adjusting delay amounts of the acoustic signal among the speaker units (e.g., Patent Literature 1).

By installing such a speaker apparatus in an acoustic space such as a concert hall or a conference room, and appropriately adjusting the delay amounts for the respective speaker units, the directional characteristics of the speaker apparatus can be controlled so as to make a specific area in the acoustic space serve as a listening target area. However, there is a problem that it is not easy to designate the delay amounts for the respective speaker units such that the directional characteristics of the speaker apparatus correspond to a desired listening target area.

The delay amounts of the speaker units must be determined on the basis of the relative positional relationship between the speaker apparatus including the direction of the speaker apparatus and the listening target area. In addition, the listening target area is not necessarily an area on a horizontal plane, or the speaker apparatus is not necessarily arranged on the same plane as the listening target area. For these reasons, it is necessary to specify the relative positional relationship between the speaker apparatus and the listening target area as a positional relationship in a three-dimensional space, and therefore it is not easy to determine the delay amounts for the respective speaker units.

In particular, at the site where the speaker apparatus is installed, determining the delay amounts for the respective speaker units is not easy. For example, it is not easy to determine how much the listening target area deviates from the front direction of the speaker apparatus. For this reason, a method that before installing the speaker apparatus, envisages the relative positional relationship between the speaker apparatus and the listening target area to preliminarily determine the delay amounts for the respective speaker units is possible. However, in the case of employing such a method, if the actual installation position and direction of the speaker apparatus in the acoustic space are different from a preliminarily envisaged position and direction, there arises a problem that the directional characteristics of the speaker apparatus do not correspond to a desired listening target area.

CITATION LIST

Patent Literature

[Patent Literature 1]
Japanese Unexamined Patent Publication JP-A2010-206451

SUMMARY OF INVENTION

Technical Problem

The present invention is made in consideration of the above circumstances, and intends to provide a loudspeaker system capable of easily determining control parameters for controlling the directional characteristics of a speaker set including two or more speaker units.

Solution to Problem

A loudspeaker system according to a first aspect of the present invention is configured to include: a speaker set including two or more speaker units; a camera that photographs an acoustic space of the speaker set, and has a predetermined relative positional relationship with the speaker set; camera image display means adapted to display a camera image photographed by the camera; target position designation means adapted to, on the basis of user operations, designate one or more than one target position on the camera image; directional control angle calculation means adapted to, on the basis of the target position, obtain one or more than one directional control angle with respect to a front direction of the speaker set; and directional control means adapted to, on the basis of the directional control angles, perform directional control of the speaker set.

In such a configuration, since the camera image obtained by photographing the acoustic space of the speaker set is displayed by the camera image display means, a user can designate any position on the camera image as the target position. Also, once the target position is designated, by referring to angle-of-view information indicating the angle of view of the camera, a deviation angle with respect to a photographing direction can be obtained. The directional control angle is one indicating how much an area in the acoustic space corresponding to the target position deviates from the front direction of the speaker set, and can be obtained from the deviation angle and the relative positional relationship between the camera and the speaker set.

Since the directional control of the speaker set is performed on the basis of such a directional control angle, the directional characteristics of the speaker set can be controlled with the area in the acoustic space corresponding to the target position designated on the camera image by a user as a listening target. Accordingly, the user is not required to determine by him-/herself how much the listening target area deviates from the front direction of the speaker set when viewed from the speaker set, and only by designating the position of the listening target area on the camera image, control parameters for controlling the directional characteristics of the speaker set can be determined.

A loudspeaker system according to a second aspect of the present invention is, in addition to the above configuration, configured such that the directional control angle calculation means calculates deviation angle of the target position with respect to a photographing direction of the camera on the basis of the target position and an angle of view of the camera, and on the basis of the deviation angle, calculates the directional control angle.

A loudspeaker system according to a third aspect of the present invention is, in addition to the above configuration, configured such that the target position designation means determines an area on the camera image on the basis of two or more positions on the camera image to specify a predetermined position in the area as a first target position, the two or more positions being designated by a user; and the directional control angle calculation means calculates a deviation angle of the first target position with respect to a photographing direction of the camera on the basis of the first target position and an angle of view of the camera, and on the basis of the deviation angle, calculates the directional control angle.

A loudspeaker system according to a fourth aspect of the present invention is, in addition to the above configuration, configured such that the camera is arranged directed in substantially the same direction as the front direction of the speaker set; and the target position designation means specifies a position in the area as the first target position, the position being farthest from a reference position on the camera image, the reference position being predetermined related to a position of the speaker set.

A loudspeaker system according to a fifth aspect of the present invention is, in addition to the above configuration, configured such that each of the speaker units of the speaker set is supplied with a common acoustic signal; and the directional control means determines a delay amount of the acoustic signal between adjacent speaker units on the basis of the directional control angle, and makes the delay amount uniform throughout the respective speaker units. Such a configuration makes it possible to, as the listening target, cover an area in the acoustic space corresponding to the first target position on the camera image.

A loudspeaker system according to a sixth aspect of the present invention is, in addition to the above configuration, configured such that the target position designation means determines an area on the camera image on the basis of two or more positions on the camera image to specify a predetermined position in the area as a first target position, the two or more positions being designated by a user, and specifies a predetermined position different from the first target position in the area as a second target position; the directional control angle calculation means calculates a first deviation angle of the first target position with respect to a photographing direction of the camera on the basis of the first target position and an angle of view of the camera to, on the basis of the firs deviation angle, calculate a first directional control angle, and calculates a second deviation angle of the second target position with respect to the photographing direction of the camera on the basis of the second target position and the angle of view of the camera to, on the basis of the second deviation angle, calculate a second directional control angle; and the directional control means performs the directional control of the speaker set on the basis of the first directional control angle and the second directional control angle.

A loudspeaker system according to a seventh aspect of the present invention is, in addition to the above configuration, configured such that the camera is arranged directed in substantially the same direction as the front direction of the speaker set; and the target position designation means specifies a position in the area as the first target position, the position being farthest from a reference position on the camera image, the reference position being predetermined related to a position of the speaker set, and specifies a position in the area as the second target position, the position being closest to the reference position.

A loudspeaker system according to an eighth aspect of the present invention is, in addition to the above configuration, configured such that each of the speaker units of the speaker set is supplied with a common acoustic signal; and the directional control means determines a first delay amount of the acoustic signal between a first speaker unit arranged at one end of an array and its adjacent speaker unit on the basis of the first directional control angle, determines a second delay amount of the acoustic signal between a second speaker unit arranged at another end of the array and its adjacent speaker unit on the basis of the second directional control angle, and for speaker units between the first speaker unit and the second speaker unit, determines delay amounts of the acoustic signal by an interpolation operation based on the first delay amount and the second delay amount. Such a configuration makes it possible to, as the listening target, cover an area including an area in the acoustic space corresponding to the first target position and an area in the acoustic space corresponding to the second target position. Also, sound waves emitted from the respective speaker units are efficiently distributed in the area, and therefore in the area, sufficient sound pressure can be ensured.

A loudspeaker system according to a ninth aspect of the present invention is, in addition to the above configuration, configured to include: listening surface designation means adapted to designate a listening surface in the acoustic space; target area determination means adapted to, on the basis of the two or more target positions, determine a target area that is an area on the camera image; and listening area calculation means adapted to obtain an area on the listening surface as a listening area, the area corresponding to the target area, in which the directional control means performs the directional control of the speaker set on the basis of the listening area.

Such a configuration makes it possible for a user to designate two or more target positions to thereby, as the listening target, determine the target area that is any area on the camera image. Also, as a plane in the acoustic space, a listening surface is predesignated, and when a user designates the target area, an area on the listening surface corresponding to the target area is obtained as the listening area, and on the basis of the listening area, the directional control of the speaker set is performed.

That is, when the user designates a two-dimensional area on the camera image as the target area, an area in the three-dimensional acoustic space is designated as the listening area, and the directional control of the speaker set appropriate for the listening area is performed. Accordingly, the user can easily designate the three-dimensional listening target area where a predetermined sound pressure should be ensured, and appropriately for the listening target area, perform the directional control of the speaker set. In addition, since the listening target area can be designated on the camera image, it can be intuitively designated.

Further, by installing the speaker set in the acoustic space and designating the target area on the camera image photographed by the camera of the loudspeaker system, the listening target area can be designated in consideration of the actual position and direction of the speaker set in the acoustic space. Accordingly, the directional characteristics of the speaker set can be accurately fitted to the listening target area.

A loudspeaker system according to a tenth aspect of the present invention is, in addition to the above configuration, configured such that the listening surface designation means designates the listening surface relatively to a reference plane that is predetermined with the camera as a reference.

In such a configuration, the listening plane is designated relative to the reference plane specified on the basis of the position and direction of the camera. For example, the listening plane can be designated on the basis of a height from and a tilt with respect to the reference plane. For this reason, a user can easily designate the listening surface. Also, by designating the listening surface with the camera as a reference, an operation for obtaining the listening area from the target area is made easy.

A loudspeaker system according to an eleventh aspect of the present invention is, in addition to the above configuration, configured such that the two or more speaker units included in the speaker set are two-dimensionally arranged on a front panel of a housing; and the directional control means performs phase control of the speaker units so as to make sound pressure substantially constant at least on a boundary line of the listening area. Such a configuration makes it possible to control the directional characteristics of the speaker set such that inside the listening area, sound pressure at a certain level or more is ensured, and outside the listening area, sound pressure is at the certain level or less.

A loudspeaker system according to a twelfth aspect of the present invention is, in addition to the above configuration, configured such that the two or more speaker units are disposed on a front panel of a housing in a state of being directed in a substantially same direction; and the camera is disposed on the front panel in a state of being directed in a substantially same direction as the front direction of the speaker set. In such a configuration, since the front direction of the speaker set is substantially coincident with the photographing direction of the camera, a configuration to obtain the directional control angles from the target positions on the camera image can be simplified.

A loudspeaker system according to a thirteenth aspect of the present invention is, in addition to the above configuration, configured such that the camera has an angle of view narrower than a maximum sound emitting angle of the speaker set, and a photographing direction adjustment mechanism adapted to move a photography axis; and the listening area calculation means obtains the listening area on the basis of the target area and a direction of the photography axis.

Such a configuration makes it possible to photograph any area within the maximum sound emitting angle as the camera image even with the camera having the angle of view narrower than the maximum sound emitting angle by moving the photography axis. Also, by obtaining the listening area in consideration of the direction of the photography axis at the time when the camera image was photographed, any area within the maximum sound emitting angle can be appropriately designated as the listening area.

A loudspeaker system according to a fourteenth aspect of the present invention is, in addition to the above configuration, configured to include: marginal area storage means adapted to retain a marginal area designatable as the target position; area comparison means adapted to compare the target positions designated by the target position designation means with the marginal area; and user report means adapted to make a user report on a basis of a result of the comparison by the area comparison means.

In such a configuration, since the user report is made after the comparison between the predetermined marginal area and the target positions, if a position outside the marginal area is designated as any of the target positions, a user can be made to recognize that the position is outside the marginal area.

Effects of Invention

In the loudspeaker system according to the present invention, when a user designates positions on the camera image as the target positions, the directional control angles indicating how much an area in the acoustic space corresponding to the target positions deviates from the front direction of the speaker set are obtained, and the directional control of the speaker set is performed. In particular, when a user designates a two-dimensional area on the camera image as the target area, an area in the three-dimensional acoustic space is designated as the listening are, and the directional control of the speaker set appropriate for the listening area is performed. For this reason, the control parameters for controlling the directional characteristics of the speaker set including the two or more speaker units can be easily determined.

DESCRIPTION OF EMBODIMENTS

Embodiment 1

Loudspeaker System 1

Figure 1:
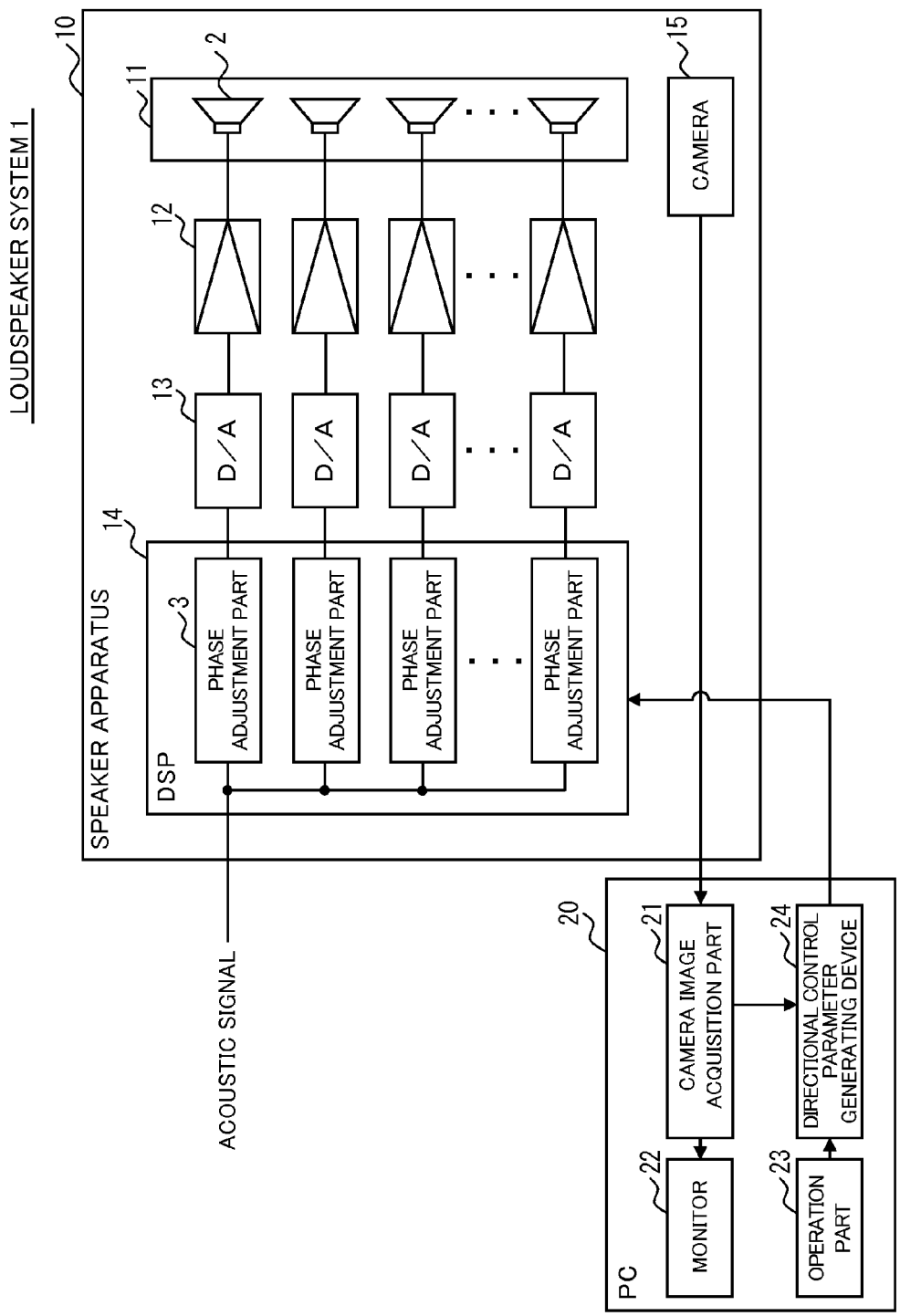
FIG. 1 is a block diagram illustrating a configuration example of a loudspeaker system 1 according to Embodiment 1 of the present invention.

FIG. 1 is a block diagram illustrating a configuration example of a loudspeaker system 1 according to Embodiment 1 of the present invention. The loudspeaker system 1 is configured to include: a speaker apparatus 10 that amplifies an acoustic signal inputted from an external device to output it from two or more speaker units 2; and a PC (personal computer) 20 that generates directional control parameters for controlling the directional characteristics of the speaker apparatus 10.

The speaker apparatus 10 is an array speaker capable of performing the directional control of acoustic output by adjusting a delay amount of the acoustic signal, and configured to include a speaker set 11 including the two or more speaker units 2, amplifiers 12, digital/analog converters 13, a DSP (digital signal processor) 14, and a camera 15.

The speaker set 11 is an array unit in which the respective speaker units 2 are arranged in an array. The digital/analog converters 13 and the amplifiers 12 are provided for the respective speaker units 2.

The acoustic signal includes a frequency component in an audio band, and generated with, for example, a microphone serving as a signal source. Each of the speaker units 2 is a loudspeaker element adapted to convert the acoustic signal into a sound wave, and for example, in the case of a dynamic type speaker unit, configured to include a diaphragm such as cone paper, and a voice coil for vibrating the diaphragm.

The DSP 14 is phase adjustment means adapted to adjust the delay amount of the acoustic signal to be supplied to the speaker units 2, and includes two or more phase adjustment parts 3, which are related to the speaker units 2. The acoustic signal inputted to the DSP 14 is distributed for each of the speaker units 2, and supplied to the phase adjustment parts 3. Each of the phase adjustment parts 3 is a phase circuit adapted to shift the phase of the acoustic signal by a predetermined amount on the basis of the directional control parameters. Also, each of the phase adjustment parts 3 makes the delay amount different for each frequency of the acoustic signal.

The phase adjustment parts 3 are provided for the respective speaker units 2. Acoustic signals after the delay amount adjustment by the DSP 14 are converted to analog signals by the digital/analog converters 13, then amplified by the amplifiers 12, and supplied to the speaker units 2, respectively.

The camera 15 is an imaging device adapted to photograph the acoustic space of the speaker set 11 to generate a camera image. The camera 15 photographs a space where the speaker apparatus 10 is installed. The camera image is generated on the basis of a photographing instruction from the PC 20. For example, a digital color camera having a constant angle of view is used as the camera 15, and a color image as a still image is generated as the camera image.

The PC 20 is a terminal device including a camera image acquisition part 21, monitor 22, operation part 23, and directional control parameter generating part 24, and functions as a directional control parameter generating device. The operation part 23 is an input device adapted to receive a user operation to generate a predetermined operation signal, and includes a keyboard having multiple operation keys, and a pointing device for operating a pointing object on the monitor 22.

The camera image acquisition part 21 generates the photographing instruction on the basis of the operation signal from the operation part 23 and acquires the camera image from the camera 15. For example, the photographing instruction is generated on the basis of a user operation after the installation of the speaker apparatus 10 in the acoustic space. The monitor 22 is a display device adapted to, on a screen, display the camera image acquired by the image acquisition part 21.

When a user designates a position on the camera image as a target position, the directional control parameter generating part 24 generates directional control parameters for determining an area in the acoustic space corresponding to the target position as a listening target, and writes them in the DSP 14. The directional control parameters are control information that provides the delay amount for each of the phase adjustment parts 3, and by writing the directional control parameters in the DSP 14, the directional characteristics of the speaker set 11 are controlled.

<Speaker Apparatus 10>

Figure 2:
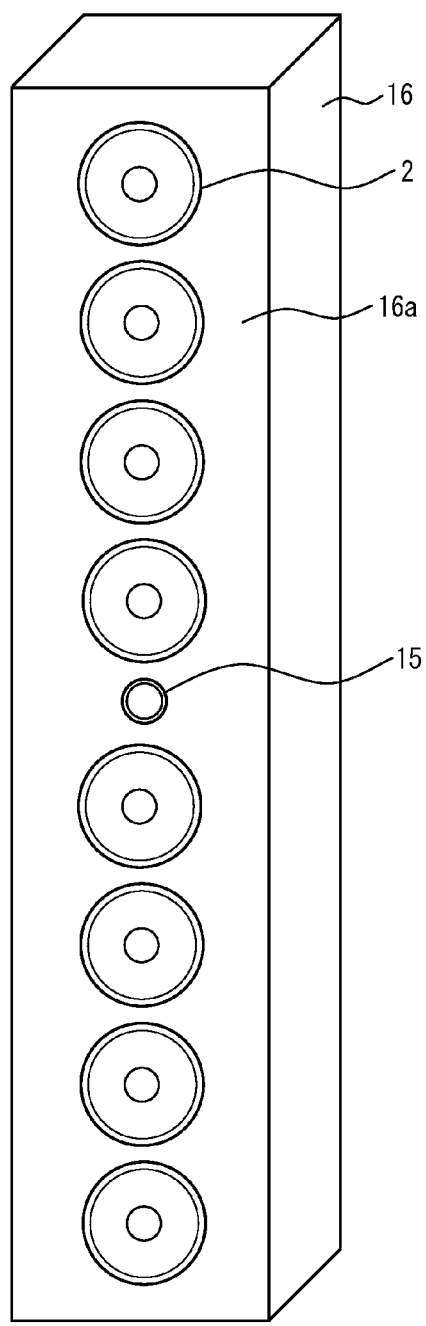
FIG. 2 is a perspective view illustrating a configuration example of the speaker apparatus 10 in FIG. 1.

FIG. 2 is a perspective view illustrating a configuration example of the speaker apparatus 10 in FIG. 1, in which as an example of the speaker apparatus 10, a line array speaker disposed with eight speaker units 2 on a front panel 16a of an housing 16 is illustrated. The housing 16 is of a vertically long rectangular parallelepiped shape, and the front panel 16a is of a planar shape.

The respective speaker units 2 are speaker units driven by the common acoustic signal, and arranged with vertical positions thereof displaced. Also, the respective speaker units 2 are disposed on the front panel 16a in a state of being directed in substantially the same direction so as to set a direction perpendicular to the front panel 16a as a front direction of the speaker apparatus 10.

The camera 15 is disposed on the front panel 16a in a state of being directed in the front direction of the speaker apparatus 10, i.e., in substantially the same direction as the direction perpendicular to the front panel 16a. That is, a photographing direction of the camera 15 is coincident with the front direction of the speaker apparatus 10. In this example, the camera 15 is arranged in the central part of the front panel 16a.

In the case of installing such a speaker apparatus 10 in the acoustic space in a state of being raised in a vertical direction, the acoustic signal to be supplied to the respective speaker units 2 is adjusted in delay amount between adjacent speaker units 2, and thereby the directional characteristics of the speaker apparatus 10 can be arbitrarily controlled in an elevation/depression angle direction. For example, a sound emitting angle of the speaker apparatus 10 can be widened or narrowed in the elevation/depression angle direction. Also, a sound emitting direction of the speaker apparatus 10 can be directed upward or downward. The sound emitting angle is a physical quantity indicating the spread of a sound wave emitted from the speaker apparatus 10, and refers to an angle indicating an area where a constant sound pressure can be obtained. In addition, the sound emitting angle may be referred to as a directivity angle.

Note that in the case where a relative positional relationship with the speaker set 11, including the angle relationship between the direction of the camera 15 and the direction of the speaker set 11 is predetermined, the camera 15 is not required to be disposed on the front panel 16a. For example, the camera 15 may be configured to be arranged separately from the front panel 16a by using an attachment member. Also, the photographing direction of the camera 15 does not have to be coincident with the front direction of the speaker apparatus 10.

<Target Position 32 on Camera Image 30>

Figure 3:
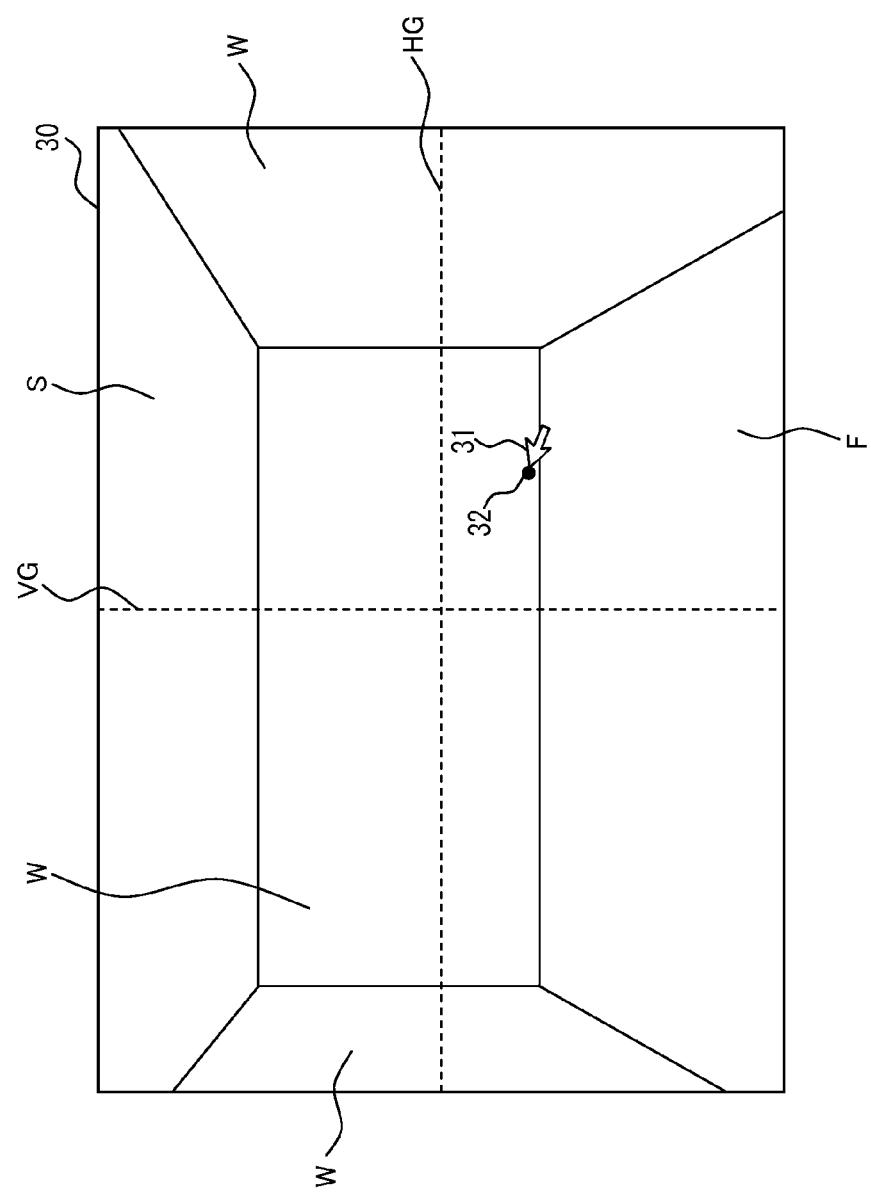
FIG. 3 is a diagram illustrating an example of a camera image 30 displayed on the monitor 22 of the PC 20 in FIG. 1.

FIG. 3 is a diagram illustrating an example of the camera image 30 displayed on the monitor 22 of the PC 20 in FIG. 1. The speaker apparatus 10 is installed with an indoor space such as a concert hall or a conference room, or outdoor space such as an outdoor arena as the acoustic space. The camera 15 photographs such an acoustic space to generate the camera image 30.

The camera image 30 is a photographed image obtained by photographing a space surrounded by a horizontal ceiling S and floor surface F, and vertical wall surfaces W. In this example, a vertical guide line VG and a horizontal guide line HG centering on the position of a photography axis are indicated by dashed lines. The guide line VG is a straight line indicating a vertical angle of view of the camera 15, and the guide line HG is a straight line indicating a horizontal angle of view of the camera 15.

Since such a camera image 30 is displayed on the monitor 22, a user can designates any position on the camera image 30 as the target position 32. The target position 32 is designated by, for example, performing a mouse operation to move a mouse cursor 31 on the camera mage 30, and then performing a click operation. Also, in the case where a two-dimensional area on the camera image 30 is indicated by performing multiple click operations and drag operations, the center position or gravity center position of the two-dimensional area is designated as the target position 32.

After the target position 32 has been designated, by referring to angle-of-view information indicating the angles of view of the camera 15, deviation angles δ of the target position 32 with respect to the photographing direction of the camera 15 can be obtained. Specifically, after a position on the camera image 30 has been designated as the target position 32, position coordinates on the camera image 30, for example, a vertical position coordinate and a horizontal position coordinate expressed on a pixel basis are respectively converted into a vertical deviation angle δx and a horizontal deviation angle δy, using the vertical angle of view and the horizontal angle of view.

The deviation angles δx and δy are angles indicating how much an area in the acoustic space corresponding to the target position 32 deviates from the photographing direction of the camera 15. For example, the deviation angle δx=−8° means that a gaze direction corresponding to the target position 32 deviates downward from the photographing direction by 8°, and the deviation angle δy=10° means that a gaze direction corresponding to the target position 32 deviates rightward from the photographing direction by 10°.

On the other hand, directional control angles θ indicating how much the area in the acoustic space corresponding to the target position 32 deviates from the front direction of the speaker apparatus 10 can be obtained from the above-described deviation angles δx and δy, and the relative positional relationship between the camera 15 and the speaker set 11. The directional control parameters are determined in accordance with such directional control angles θ.

In the present embodiment, since the photographing direction of the camera 15 is coincident with the front direction of the speaker apparatus 10, the deviation angles δ can be directly used as the directional control angles θ. For example, in the case where the vertical angle of view and horizontal angle of view of the camera 15 are respectively 60° and 90°, and the vertical deviation angle δx and horizontal deviation angle δy indicating the target position 32 are given by (δx, δy)=(−8, 10), a directional control angle θx in the elevation/depression angle direction, and a directional control angle θy in an azimuth angle direction are given by (θx, θy)=(−8, 10).

<Directional Control Parameter Generating Part 24>

Figure 4:
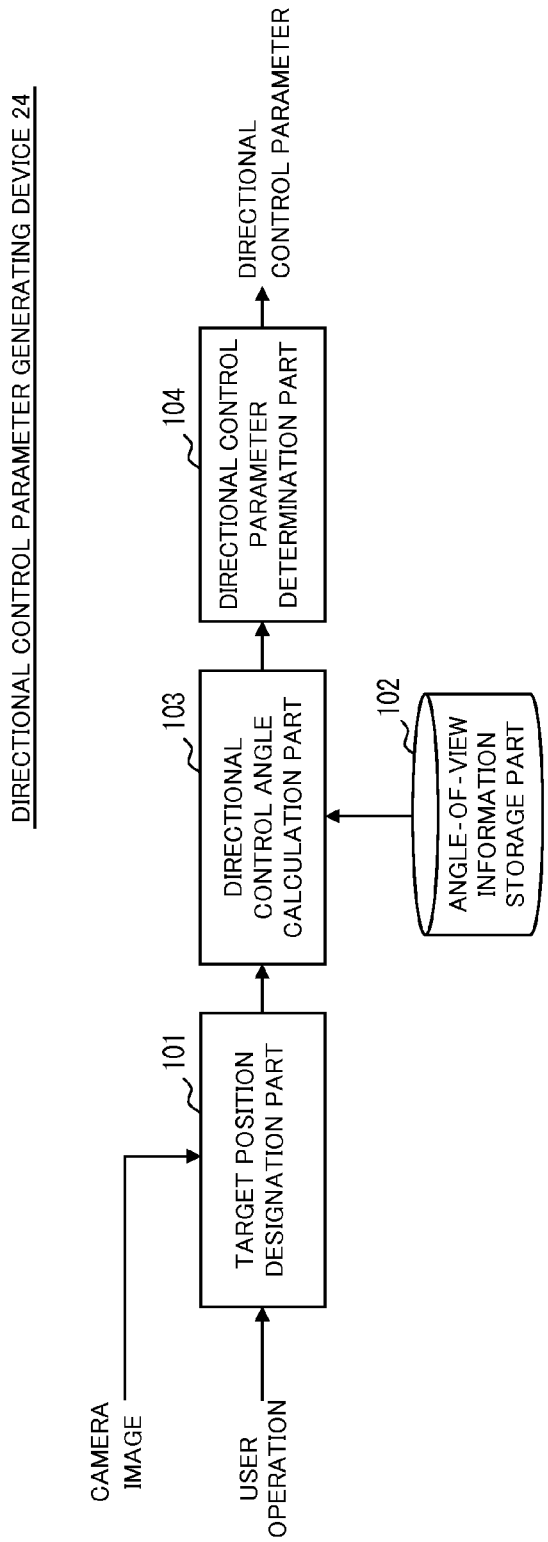
FIG. 4 is a block diagram illustrating a configuration of the directional control parameter generating part 24 in FIG. 1.

FIG. 4 is a block diagram illustrating a configuration example of the directional control parameter generating part 24 in FIG. 1. The directional control parameter generating part 24 is configured to include a target position designation part 101, angle-of-view information storage part 102, directional control angle calculation part 103, and directional control parameter determination part 104. The target position designation part 101 designates the target position 32 on the camera image 30 on the basis of a user operation.

The angle-of-view information storage part 102 retains the angle-of-view information including the vertical angle of view and the horizontal angle of view of the camera 15. The directional control angle calculation part 103 obtains the directional control angles θ with respect to the front direction of the speaker apparatus 10 on the basis of the target position 32 designated by the target position designation part 101. Specifically, first, by referring to the angle-of-view information in the angle-of-view information storage part 102, the deviation angles δ with respect to the photographing direction of the camera 15 are obtained. Then, the directional control angle θ in the elevation/depression angle direction is obtained on the basis of the deviation angle δ, the relative positional relationship between the camera 15 and the speaker set 11, and the emission characteristics of the sound wave emitted from the speaker apparatus 10.

The directional control parameter determination part 104 determines the directional control parameter for controlling the directional characteristics of the speaker apparatus 10, on the basis of the directional control angle θ obtained by the directional control angle calculation part 103. Specifically, the delay amount for each of the phase adjustment parts 3 is obtained from the directional control angle θ to determine the directional control parameter. The directional control parameter is determined such that for example, the delay amount of the acoustic signal between adjacent speaker units 2 has the same value throughout all the speaker units 2.

According to the present embodiment, since the camera image 30 is displayed on the monitor 22, a user can designate any position on the camera image 30 as the target position 32. Also, once the target position 32 is designated, by referring to the angle-of-view information, the deviation angles δ with respect to the photographing direction and the directional control angles θ can be obtained.

The directional control of the speaker apparatus 10 is performed on the basis of such directional control angles θ, and therefore the directional characteristics of the speaker apparatus 10 can be controlled with the area in the acoustic space corresponding to the target position 32 designated on the camera image 30 by a user as the listening target. Accordingly, it is not necessary for a user to determine by him-/herself how much the listening target area deviates from the front direction of the speaker apparatus 10 when viewed from the speaker apparatus 10, and only by designating the position of the listening target area on the camera image 30, the control parameters for controlling the directional characteristics of the speaker apparatus 10 can be determined.

Embodiment 2

In Embodiment 1, an example of the case where a position on the camera image 30 designated by a user is used as the target position 32 to control the directional characteristics of the speaker apparatus 10 is described. On the other hand, in the present embodiment, the case where an area on a camera image 30 is determined from two or more positions designated on the camera image 30 by a user, and a predetermined position in the area is specified as a target position 32 is described.

<Target Position 32>

Figure 5:
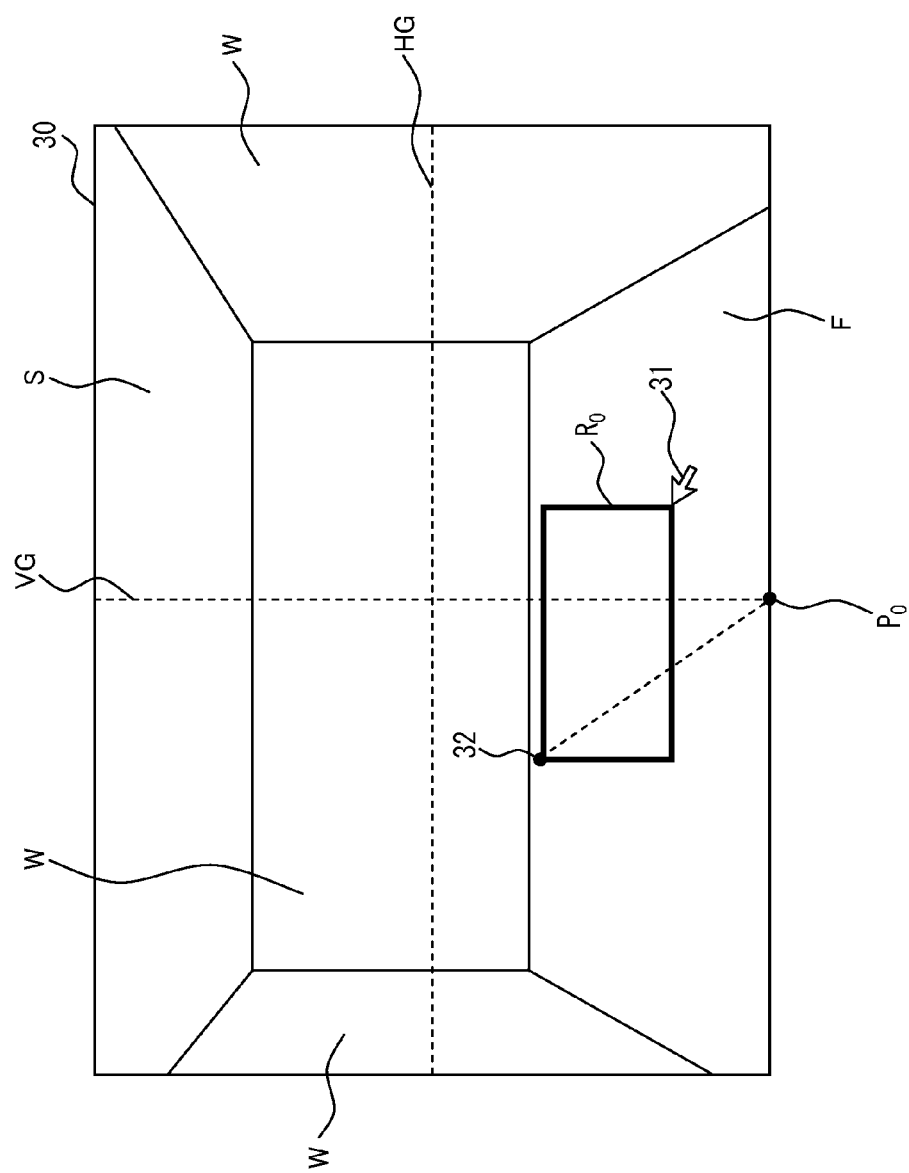
FIG. 5 is a diagram illustrating an example of an area $R_0$ on a camera image 30 determined in a loudspeaker system 1 according to Embodiment 2 of the present invention, and a target position 32 specified from the area $R_0$.

FIG. 5 is a diagram illustrating an example of an area $R_0$ on the camera image 30 determined in a loudspeaker system 1 according to Embodiment 2 of the present invention, and the target position 32 specified from the area $R_0$. A target position designation part 101 of a directional control parameter generating part 24 determines the area $R_0$ on the camera image 30 on the basis of two or more positions on the camera image 30 designated by a user. For example, when two different positions on the camera image 30 are designated by a drag operation for moving a mouse cursor 31 on the camera image 30 by a mouse operation, a rectangular-shaped area is determined as the area $R_0$.

The target position designation part 101 specifies a predetermined position in the area $R_0$ as the target position 32. For example, a two-dimensional position in the area $R_0$ farthest from a reference position $P_0$ on the camera image, which is predetermined related to the position of the speaker apparatus 10, is specified as the target position 32. For example, the reference position $P_0$ is the middle point of the lower side of the camera image 30, and corresponds to a field-of-view limit on a guide line VG.

A directional control angle calculation part 103 calculates deviation angles δx and δy of the target position 32 with respect to a photographing direction of a camera 15 on the basis of the target position 32 and the angles of view of the camera 15, and on the basis of the deviation angles δx and δy, calculates directional control angles θ. Also, a directional control parameter determination part 104 determines a delay amount of an acoustic signal between adjacent speaker units 2 on the basis of such directional control angles θ, and makes the delay amount uniform throughout respective speaker units 2.

Figure 6:
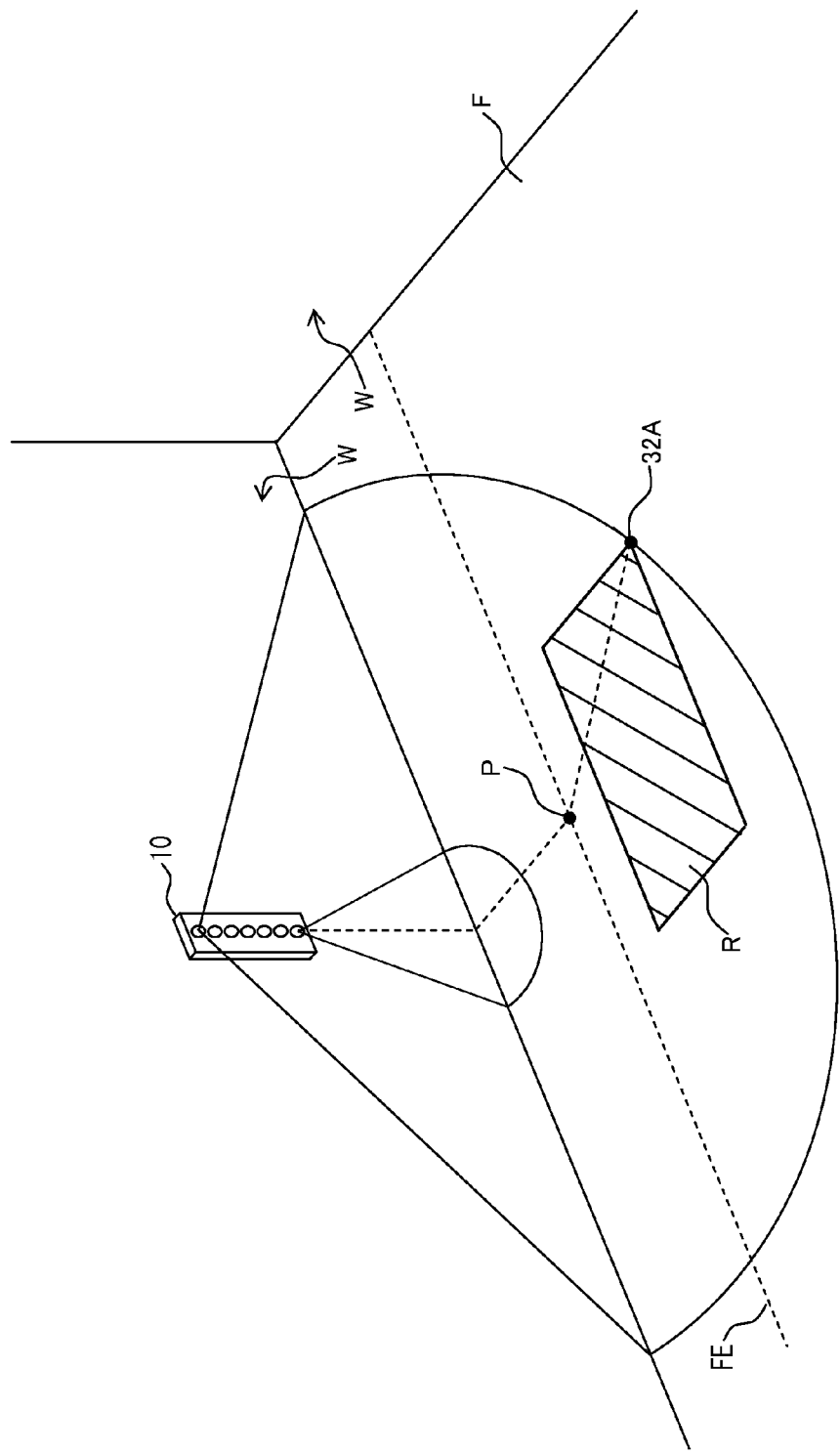
FIG. 6 is an explanatory diagram schematically illustrating an example of the relationship between an emission pattern of a speaker apparatus 10 in the loudspeaker system 1 in FIG. 5 and an area R on a floor surface F.
Figure 7:
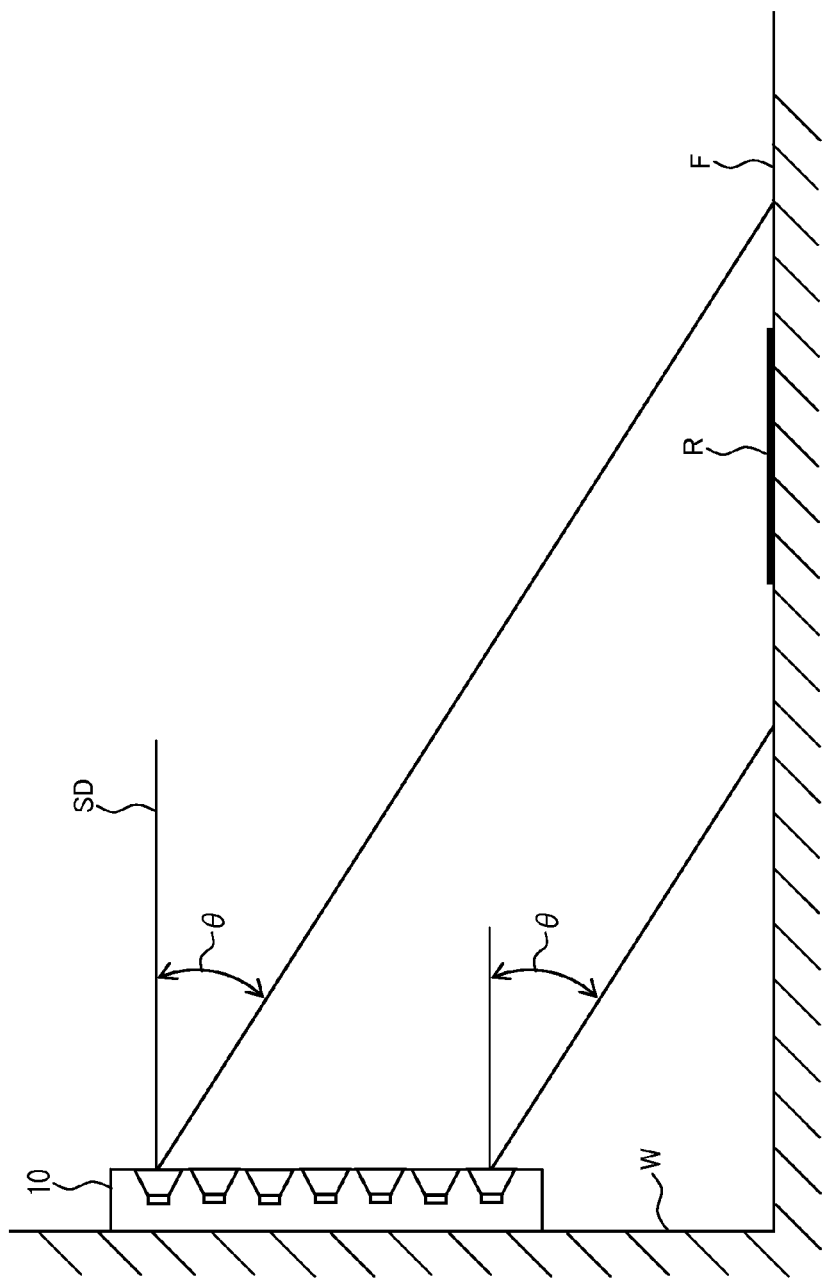
FIG. 7 is a diagram illustrating a situation of the relationship between the emission pattern and the area R in FIG. 6 when viewed in a horizontal direction.

FIG. 6 is an explanatory diagram schematically illustrating an example of the relationship between an emission pattern of the speaker apparatus 10 in the loudspeaker system 1 in FIG. 5 and the area R on a floor surface F. FIG. 7 is a diagram illustrating a situation of the relationship between the emission pattern and the area R in FIG. 6 when viewed in a horizontal direction. The speaker apparatus 10 in the diagrams is one illustrated in FIG. 2, and attached on a wall surface W in a state where a longer direction thereof is made coincident with a vertical direction. Also, FIG. 7 illustrates the case where an acoustic space is cut by a vertical surface that is parallel to a front direction SD of the speaker apparatus 10 and includes the speaker apparatus 10.

The area R is an area on the floor surface F corresponding to the area $R_0$ on the camera image 30. Vertical directional control is performed by adjusting the delay amount of the acoustic signal between adjacent speaker units 2. An emission pattern of a sound wave emitted from the speaker apparatus 10 is of a substantially conical shape. For this reason, a simplest way to cover the area R as a listening target area is to specify a position in the area $R_0$ corresponding to a position 32A farthest from a reference position P in the area R as the target position 32 to determine the directional control angle θ in an elevation/depression angle direction.

The reference position P is a position on the floor surface F corresponding to the reference position $P_0$ on the camera image 30, and on a FE (front-end) line indicating the field-of-view limit of the camera 15. In the present embodiment, the two-dimensional position farthest from the reference position $P_0$ in the area $R_0$ is specified as the target position 32 to determine the directional control angle θ in the elevation/depression angle direction. By employing such a configuration, as a conical-shaped emission pattern of which the apex corresponds to the uppermost speaker unit 2, an emission pattern passing through the position 32A can be formed to cover the area R as a listening target.

According to the present embodiment, a user designates multiple positions on the camera image 30, and thereby an area $R_0$ on the camera 30 is determined, making it possible to cover an area in the acoustic space corresponding to the area $R_0$ as the listening target. In particular, since the position farthest from the reference position $P_0$ in the area $R_0$ is specified as the target position 32 to determine the directional control angle θ in the elevation/depression angle direction, the area in the acoustic space corresponding to the target position 32 can be covered as the listening target.

Embodiment 3

In Embodiment 2, an example of the case where the position farthest from the reference position $P_0$ in the area $R_0$ is specified as the target position 32 is described. On the other hand, in the present embodiment, the case where a position farthest from a reference position $P_0$ in an area $R_0$ is specified as a first target position 32, and also a position closest to the reference position $P_0$ in the area $R_0$ is specified as a second target position 32 is described.

Figure 8:
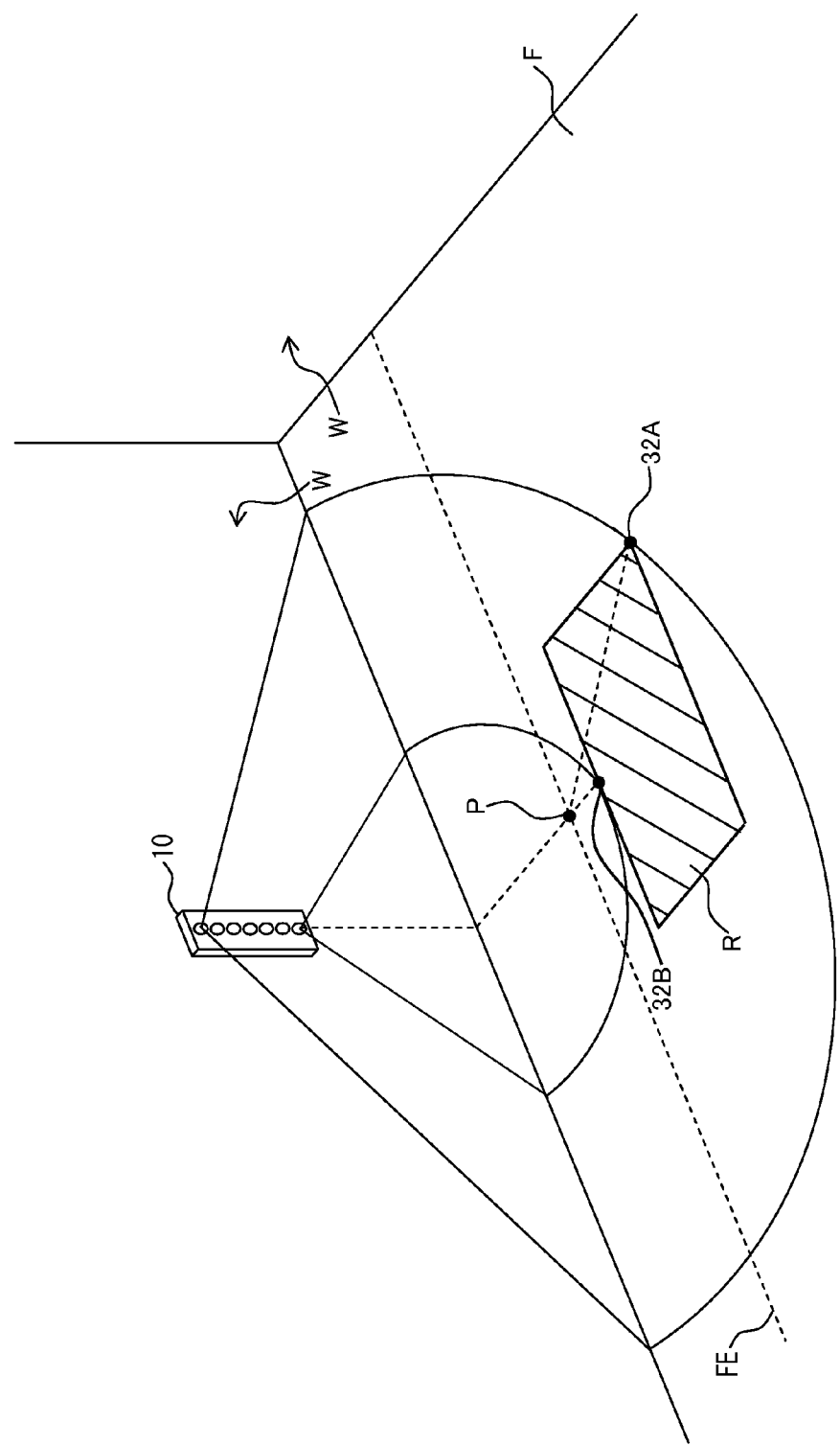
FIG. 8 is an explanatory diagram schematically illustrating an example of the relationship between an emission pattern of a speaker apparatus 10 and an area R on a floor surface F in a loudspeaker system 1 according to Embodiment 3 of the present invention.
Figure 9:
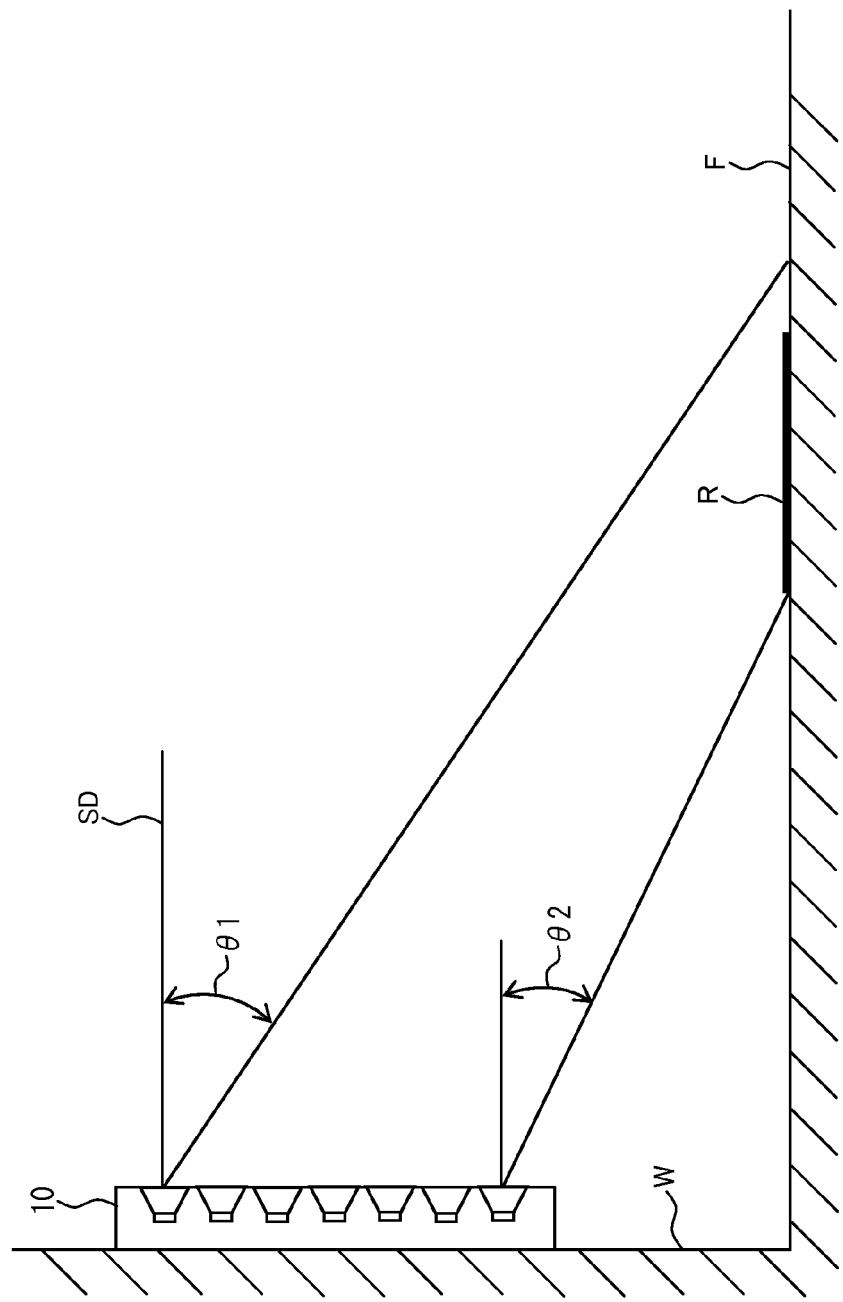
FIG. 9 is a diagram illustrating a situation of the relationship between the emission pattern and the area R in FIG. 8 when viewed in a horizontal direction.

FIG. 8 is an explanatory diagram schematically illustrating an example of the relationship between an emission pattern of a speaker apparatus 10 in a loudspeaker system 1 according to Embodiment 3 of the present invention and an area R on a floor surface F. FIG. 9 is a diagram illustrating a situation of the relationship between the emission pattern and the area R in FIG. 8 when viewed in a horizontal direction.

A target position designation part 101 of a directional control parameter generating part 24 specifies a two-dimensional position farthest from the reference position $P_0$ in the area $R_0$ as the first target position 32, and also specifies a two-dimensional position closest to the reference position $P_0$ in the area $R_0$ as the second target position 32. The first target position 32 is a position at the upper left apex of the area $R_0$, and the second target position 32 is a position on a guide line VG.

A directional control angle calculation part 103 calculates deviation angles δ1 of the first target position 32 with respect to a photographing direction of a camera 15 on the basis of the first target position 32 and the angles of view of the camera 15, and then on the basis of the deviation angles δ1, calculates directional control angles θ1. Also, the directional control angle calculation part 103 calculates deviation angles δ2 of the second target position 32 with respect to the photographing direction of the camera 15 on the basis of the second target position 32 and the angles of view of the camera 15, and then on the basis of the deviation angles δ2, calculates directional control angles θ2.

A directional control parameter determination part 104 determines a delay amount of an acoustic signal between adjacent speaker units 2 on the basis of the directional control angles θ1 and θ2. Specifically, on the basis of the directional control angles θ1, a first delay amount of the acoustic signal between a first speaker unit arranged at one end of an array, i.e., the uppermost speaker unit 2 and its adjacent speaker unit 2 is determined. Also, on the basis of the directional control angles θ2, a second delay amount of the acoustic signal between a second speaker unit arranged at the other end of the array, i.e., the lowermost speaker unit 2 and its adjacent speaker unit 2 is determined. Further, for speaker units 2 between the first speaker unit and the second speaker unit, delay amounts of the acoustic signal are respectively determined by interpolation operations based on the first delay amount and the second delay amount.

The position 32B in the area R corresponds to the target position 32 closest to the reference position $P_0$ in the area $R_0$. In the present embodiment, the delay amount for the uppermost speaker unit 2 is determined in accordance with the directional control angles θ1, whereas the delay amount for the lowermost speaker unit 2 is determined in accordance with the directional control angles θ2, and for the speaker units 2 other than the uppermost and lowermost speaker units 2, the delay amounts are respectively determined by the interpolation operations based on the first delay amount and the second delay amount. By employing such a configuration, as an emission pattern of a conical shape of which the apex corresponds to the uppermost speaker unit 2, an emission pattern passing through the position 32A can be formed, and as an emission pattern of a conical shape of which the apex corresponds to the lowermost speaker unit 2, an emission pattern passing through the position 32B can be formed.

Specifically, as the delay amount between the uppermost speaker unit 2 and its adjacent speaker unit 2, a delay time D1 is determined from the directional control angles θ1. Also, as the delay amount between the lowermost speaker unit 2 and its adjacent speaker unit 2, a delay time D2 is determined from the directional control angles θ2. Delay times for the other speaker units 2 are determined by linear interpolation depending on their vertical positions.

Note that it may be configured that instead of determining the delay times for the speaker units 2 other than the uppermost and lowermost speaker units 2 by the linear interpolation, a predetermined curved line, for example, a quadratic curve or a clothoid curve, is used to determine the delay times. Alternatively, it may be configured that a delay amount adjustment is made for each of the speaker units 2 by performing a filtering process that arbitrarily changes amplitude or phase for each frequency.

According to the present embodiment, an area including an area in an acoustic space corresponding to the first target position 32 and an area in the acoustic space corresponding to the second target position 32 can be covered as a listening target. Also, sound waves emitted from the respective speaker units 2 are efficiently distributed in the area, and therefore sufficient sound pressure can be ensured in the area.

Embodiment 4

In Embodiments 1 to 3, examples of the case where the speaker apparatus 10 includes the line array speaker are described. On the other hand, in the present embodiment, the case of applying the present invention to a speaker apparatus 10 in which two or more speaker units 2 are two-dimensionally arranged on a front panel 16a of a housing 16 is described.

<Speaker Apparatus 10>

Figure 10:
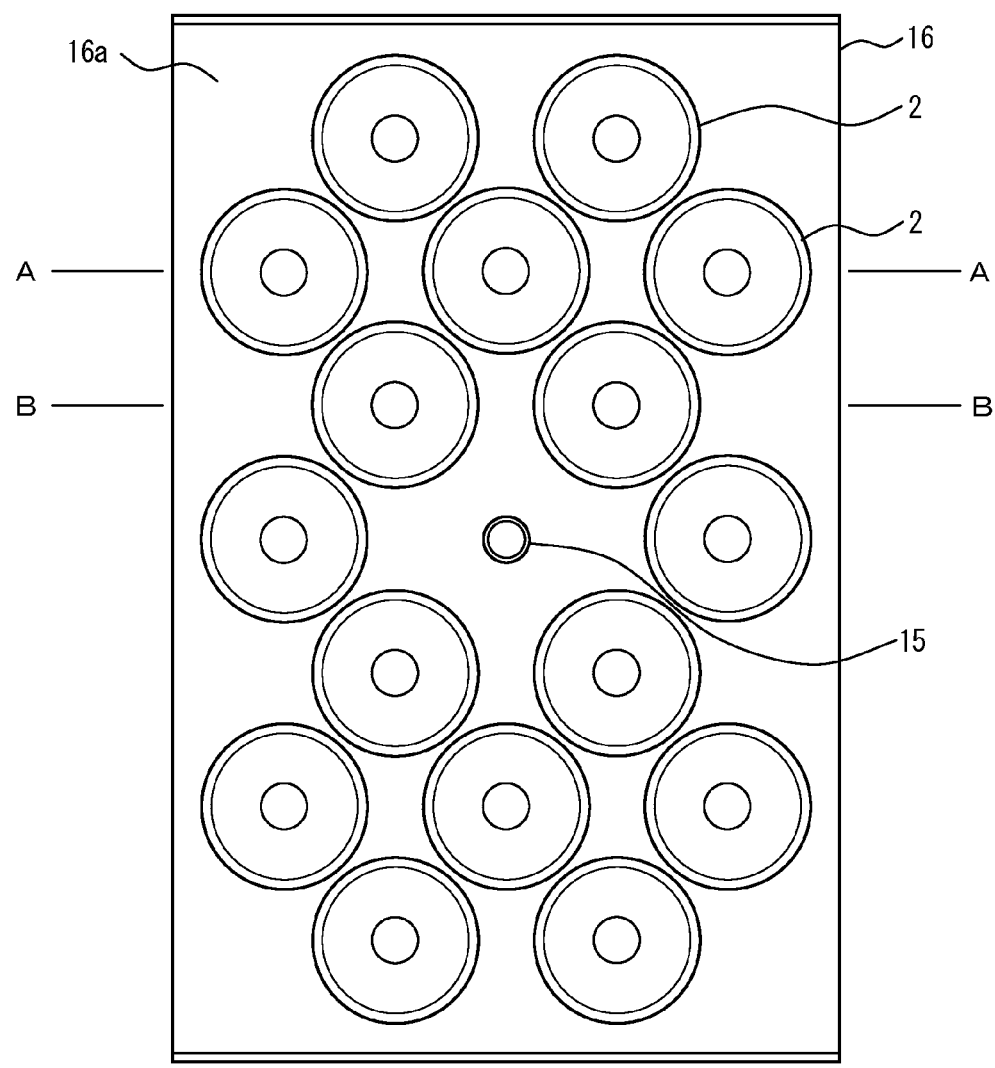
FIG. 10 is a diagram illustrating a configuration example of a loudspeaker system 1 according to Embodiment 4 of the present invention, in which a situation of a front panel 16a of a housing 16 when viewed in a front direction is illustrated.

FIG. 10 is a diagram illustrating a configuration example of a loudspeaker system 1 according to Embodiment 4 of the present invention, in which a situation of the front panel 16a of the housing 16 when viewed in a front direction is illustrated. In this diagram, the speaker apparatus 10 including 16 speaker units 2 two-dimensionally arranged in seven rows and five columns, and one camera 15 is illustrated. The respective speaker units 2 are closely arranged. The front direction of the speaker apparatus 10 is a direction serving as a reference when controlling directional characteristics, and predetermined depending on the shape of the housing 16, and the directions and arrangement configuration of the respective speaker units 2.

The housing 16 is a box body called an enclosure, and of a shape longer in a vertical direction as compared with a horizontal direction. The front panel 16a is of a curved surface shape like a part of the circumferential surface cut out of a vertically raised cylinder.

On the front panel 16a, two or three speaker units 2 are arrayed in the horizontal direction. The respective speaker units 2 are arranged adjacently at a tilt angle with respect to the horizontal direction in order to arrange as many speaker units 2 as possible within a limited space. The camera 15 is arranged in the central part of the front panel 16a with a photography axis thereof directed in the front direction of the front panel 16a.

Figure 11:
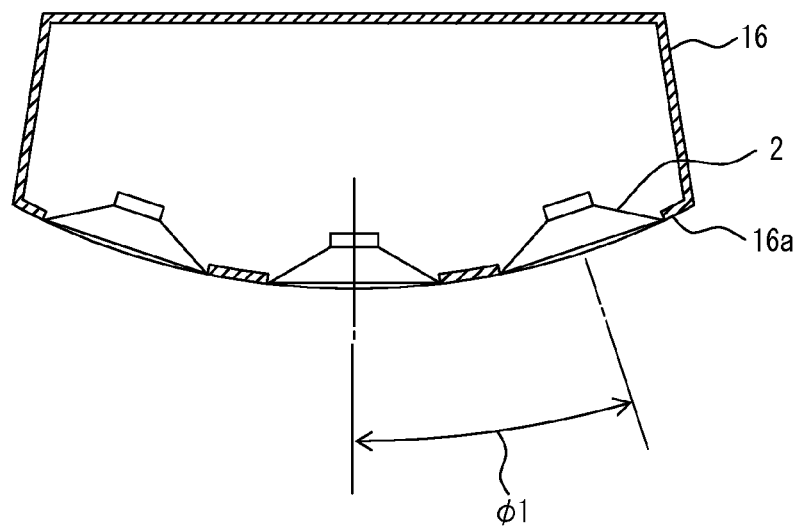
FIG. 11 is a cross-sectional view illustrating a configuration example of the speaker apparatus 10 in FIG. 10.
Figure 11:
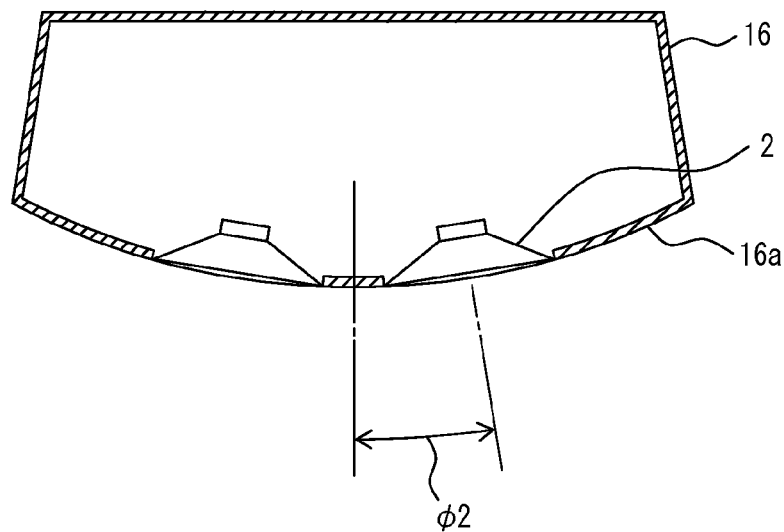

FIG. 11 is a cross sectional view illustrating a configuration example of the speaker apparatus 10 in FIG. 10, in which (a) illustrates a cut surface when cutting the housing 16 along the A-A cutting line, and (b) illustrates a cut surface when cutting the housing 16 along the B-B cutting line. Each of the speaker units 2 is arranged with a diaphragm of an opening part facing in the horizontal direction.

Along the A-A cut surface of the housing 16, three speaker units 2 are arranged. The center speaker unit 2 is arranged with its opening part directed in the front direction of the front panel 16a, and the speaker units 2 on both sides are arranged with their opening parts tilted at leftward and rightward tilt angles φ1 with respect to the front direction, respectively. For example, the tilt angle φ1 is φ1=30 degrees.

Along the B-B cut surface of the housing 16, two speaker units 2 are arranged. The respective speaker units 2 are arranged with their opening parts tilted at leftward and rightward tilt angles φ2 with respect to the front direction. For example, the tilt angle φ2 is φ2=15 degrees.

When installing such a speaker apparatus 10 in a vertically long state, by making a delay amount of an acoustic signal different depending on the vertical position of each speaker unit 2, directional characteristics in an elevation/depression direction can be controlled. For example, a vertical sound emitting angle can be widened or narrowed, or a sound emitting direction can be vertically controlled.

Also, by making a delay amount of the sound signal different depending on the horizontal position of each speaker unit 2, directional characteristics in an azimuth angle can be controlled. For example, a horizontal sound emitting angle can be widened or narrowed, or the sound emitting direction can be horizontally controlled.

In the speaker apparatus 10 illustrated in FIG. 11, the respective speaker units 2 are arranged with their opening parts directed in different directions, and therefore delay amount adjustment depending on the horizontal position of each speaker unit 2 makes it possible to emit sound at the sound emitting angle wider or narrower than 60 degrees around the front direction.

<Target Area 4>

Figure 12:
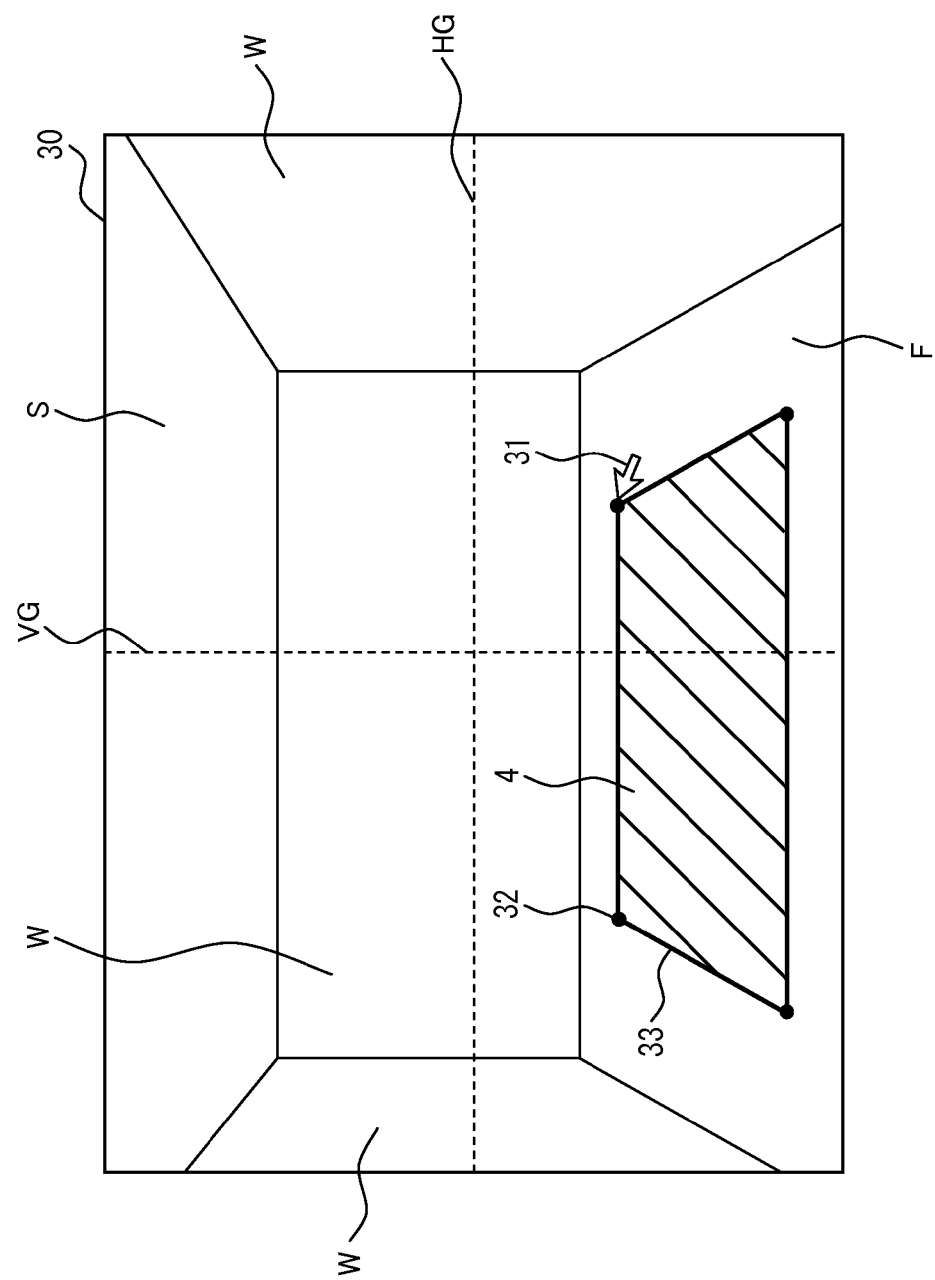
FIG. 12 is a diagram illustrating an example of a target area 4 on a camera image 30 determined in the loudspeaker system 1 in FIG. 10.

FIG. 12 is a diagram illustrating an example a target area 4 on a camera image 30 determined in the loudspeaker system 1 in FIG. 10. The target area 4 is a two-dimensional area on the camera image 30, and determined on the basis of two or more target positions 32.

A user can designate any area on the camera image 30 as the target area 4. For example, the target area 4 is one continuous area on the camera image 30, and a two-dimensional area of any shape and size can be designated as the target area 4.

Specifically, by indicating multiple target positions 32, an area surrounded by connection lines 33, i.e., an area of a polygonal shape including a triangle or a quadrangle is designated as the target area 4. Each connection line 33 is a guiding graphics object connecting two target positions 32, and a straight line indicating the boundary of the target area 4.

For example, in the case of sequentially indicating three or more target positions 32, the target positions 32 are connected by connection lines 33 in the indicated order to determine the target area 4. In this example, by sequentially indicating four target positions 32, a rectangular-shaped area on a floor surface F is designated as the target area 4.

<Listening Area 5>

Figure 13:
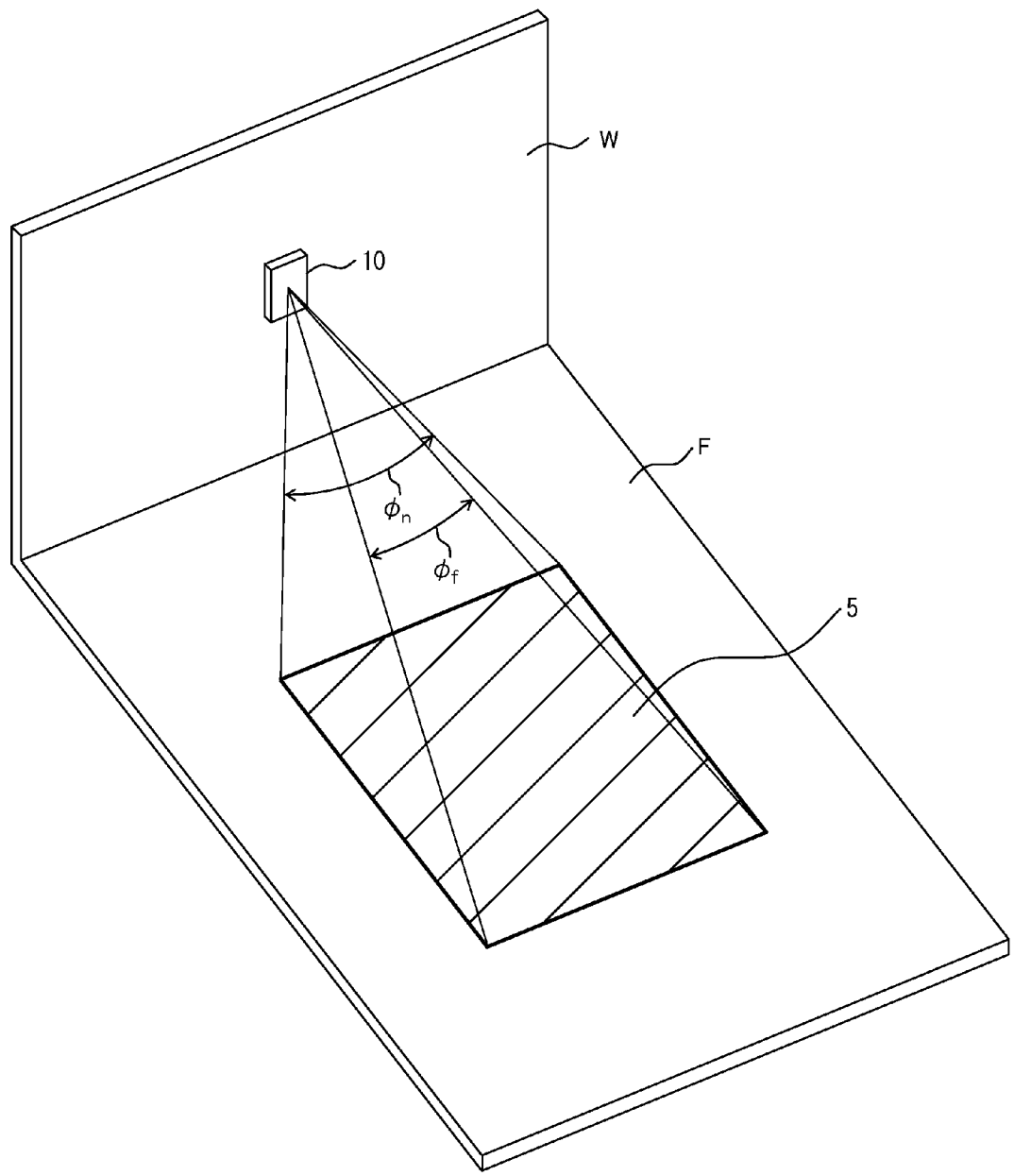
FIG. 13 is an explanatory diagram schematically illustrating an example of the relationship between an installation state of the speaker apparatus 10 in the loudspeaker system 1 in FIG. 10 and a listening area 5.

FIG. 13 is an explanatory diagram schematically illustrating an example of the relationship between an installation state of the speaker apparatus 10 in the loudspeaker system 1 in FIG. 10 and a listening area 5. The speaker apparatus 10 is installed in an acoustic space formed by a vertical wall surface W and the horizontal floor surface F. For example, the speaker apparatus 10 is installed directed in the horizontal direction at a predetermined height from the floor surface F.

Directional control of the speaker apparatus 10 is performed so as to ensure a predetermined sound pressure in the listening area 5, after obtaining an area on a listening surface corresponding to the target area 4 as the listening area 5. The listening surface is a listening target surface for providing a listening position in the three-dimensional acoustic space. For example, the floor surface F on which a listener is present is designated as the listening surface. Alternatively, a plane surface at a certain height from the floor surface F is designated as the listening surface. Specifically, considering the height of ears of a listener, a plane surface at a height of approximately 1 meter from the floor surface F is designated as the listening surface.

The listening area 5 is an area inside which sound pressure is at a certain level or more, and outside which the sound pressure is at the certain level or less. That is, the listening area 5 is an area where at least on the boundary lines thereof, the sound pressure is substantially constant.

When a user designates a two-dimensional area on the camera image 30 as the target area 4, an area in the three-dimensional acoustic space is designated as the listening area 5, and the directional control of the speaker apparatus 10 appropriate for the listening area 5 is performed. Accordingly, the user can easily designate a three-dimensional listening target area where a predetermined sound pressure should be ensured.

Note that the listening target area is an area in the acoustic space, in which a predetermined sound pressure the user desires should be ensured. On the other hand, the listening area 5 is an area that is on the listening surface 7 and corresponds to the target area 4, and that is specified by the target area 4 and the listening surface 7 and included in the listening target area.

Vertical directional control is performed by adjusting the phase difference of the acoustic signal between speaker units 2 of which vertically positions are different. That is, by making a delay amount of the acoustic signal to be supplied to a speaker unit 2 different depending on the vertical position of the speaker unit 2, the vertical directional control is performed. Horizontal directional control is, as with the vertical directional control, performed by adjusting the phase difference between speaker units 2 of which horizontal positions are different.

For example, in the case where the listening area 5 is of a rectangular shape and the directional control is performed so as to ensure a constant sound pressure in the listening area 5, by making the horizontal sound emitting angle wider for an area closer to the speaker apparatus 10, the entire listening area 5 can be covered with a uniform sound pressure. Specifically, sound emitting angles $\phi_n$ defining a side on the side close to the speaker apparatus 10 are larger than sound emitting angles $\phi_f$ defining a side on the far side. By such vertical and horizontal directional control, the boundary lines of the listening area 5 can be linearized.

In general, a sound wave attenuates in accordance with a propagation distance when propagating in space. For this reason, in order to ensure a constant sound pressure in areas far from and close to the speaker apparatus 10, it is necessary to assign more speaker units 2 for the far area. In the loudspeaker system 1 according to the present embodiment, by assigning more speaker units 2 for an area of the listening area 5 farther from the speaker apparatus 10, a sound pressure level can be made uniform.

For example, by the vertical directional control, the wave front of a combined wave of sound waves outputted from the respective speaker units 2 is represented in a clothoid curve on a vertical surface including the respective speaker units 2.

<Listening Surface 7>

Figure 14:
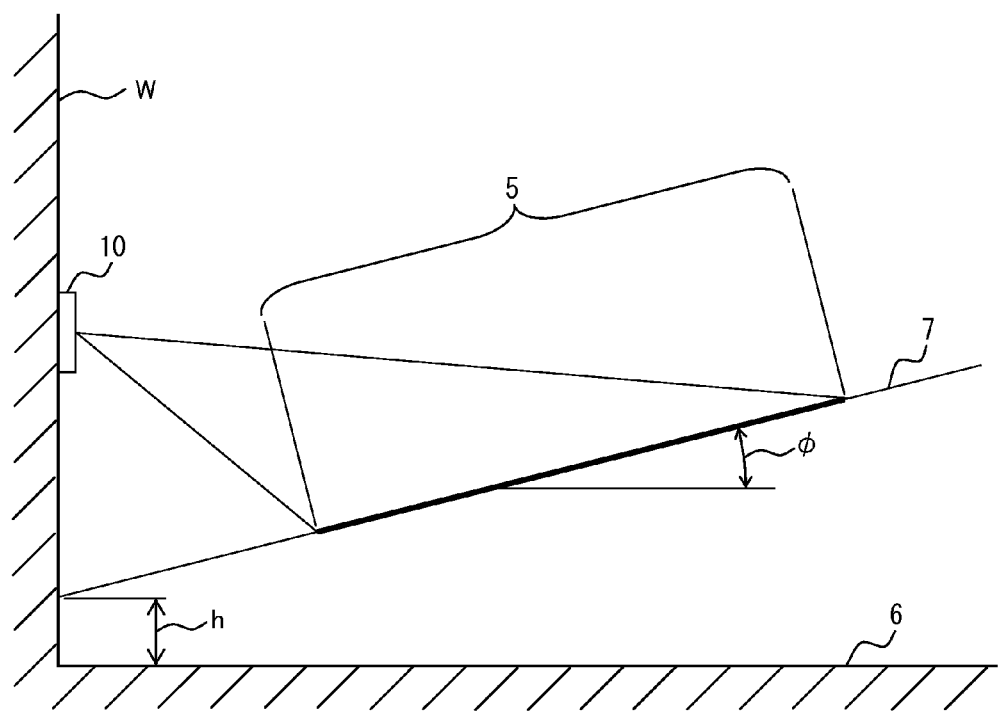
FIG. 14 is an explanatory diagram schematically illustrating another example of the relationship between the installation state of the speaker apparatus 10 in the loudspeaker system 1 in FIG. 10 and the listening area 5.

FIG. 14 is an explanatory diagram schematically illustrating another example of the relationship between the installation state of the speaker apparatus 10 in the loudspeaker system 1 in FIG. 10 and the listening area 5, in which a state where the listening surface 7 is tilted with respect to a reference plane 6 is illustrated. The reference plane 6 is a plane predetermined with the camera 15 as a reference. For example, in the case where the speaker apparatus 10 is installed on the vertical wall surface W with the camera 15 directed in the horizontal direction, one horizontal plane is determined as the reference plane 6.

Specifically, a horizontal plane positioned approximately 1 meter below the speaker apparatus 10 is determined as the reference plane 6. The listening surface 7 may tilt with respect to such a reference plane 6. For example, the case where a theater in which seats are arranged stepwise on a mortar-shaped tilted surface is used as the acoustic space is envisaged.

In such an acoustic space, by designating a tilt angle φ with respect to and a height h from the reference plane 6 as listening parameters, the listening surface 7 can be specified to appropriately determine the listening area 5. For example, the height h can be designated as a height from the reference plane 6, which is in the vertical plane including a maximum tilt line of the listening surface 7 and at the position of the speaker apparatus 10.

<Directional Control Parameter Generating Part 24>

Figure 15:
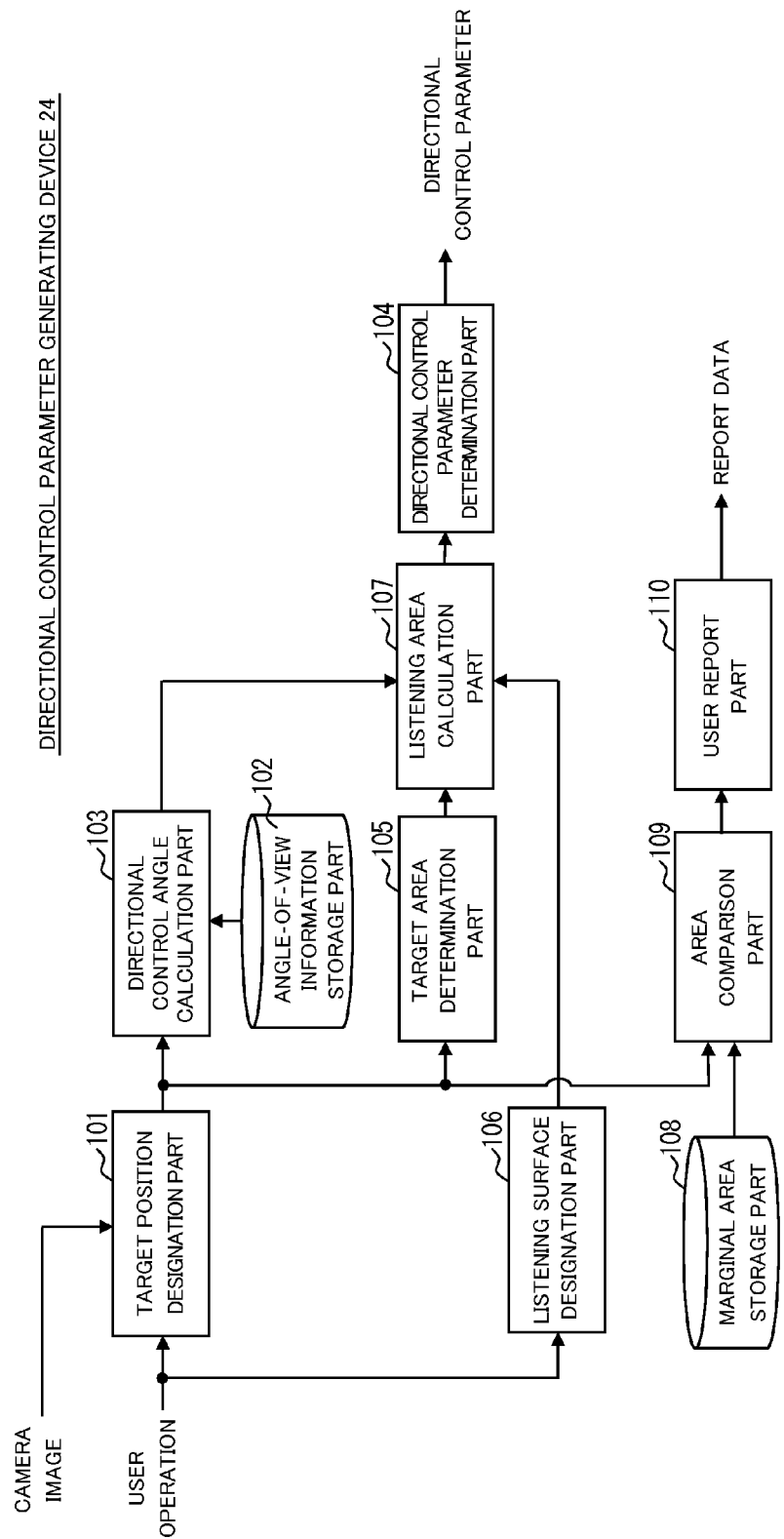
FIG. 15 is a block diagram illustrating a configuration example of a directional control parameter generating part 24 in the loudspeaker system 1 in FIG. 10.

FIG. 15 is a block diagram illustrating a configuration example of a directional control parameter generating part 24 in the loudspeaker system 1 in FIG. 10. When compared with the directional control parameter generating part 24 in FIG. 4, the directional control parameter generating part 24 is different in that it includes a target area determination part 105, listening surface designation part 106, listening area calculation part 107, marginal area storage part 108, area comparison part 109, and user report part 110.

The target area determination part 105 determines the target area 4, which is an area on the camera image 30, on the basis of two or more target positions 32 designated by the target position designation part 101. Specifically, when three or more target positions 32 are designated, an area surrounded by connection lines 33 connecting these target positions 32 is determined as the target area 4.

The listening surface designation part 106 designates the listening surface 7 in the acoustic space on the basis of a user operation. The listening surface 7 is designated relative to the reference plane 6 that is predetermined with the camera 15 as a reference. The listening area calculation part 107 obtains an area on the listening surface 7 corresponding to the target area 4 as the listening area 5. The listening area 5 can be obtained by converting a two-dimensional position on the camera image 30 to angles with respect to a photography axis of the camera 15, and from pieces of vertical and horizontal angle information, specifying a two-dimensional position on the listening surface 7. The directional control parameter determination part 104 determines directional control parameters on the basis of the listening area 5 obtained by the listening area calculation part 103.

The listening surface designation part 106 receives the tilt angle φ with respect to and the height h from the reference plane 6 as the listening parameters, and on the basis of these listening parameters, generates surface designation data for designating the listening surface 7 to output it to the listening area calculation part 107. The surface designation data includes information for specifying the reference plane 6.

The directional control parameter determination part 104 determines the directional control parameters so as to make sound pressure substantially constant at least on the boundary lines of the listening area 5. That is, a delay amount for each speaker unit is determined such that inside the listening area 5, an acoustic signal arrives so as to have sound pressure at a certain level or more, and outside the listening area 5, the sound pressure of the acoustic signal is at less than the certain level.

The marginal area storage part 108 retains a marginal area designatable as the target position 32. In the case where the angle of view of the camera 15 are wider than maximum sound emitting angle of the speaker apparatus 10, in the field of view of the camera 15, an area that cannot be included in the listening area 5 even by the directional control of the speaker apparatus 10 is present. The maximum sound emitting angle here is used to refer to the angle indicating a maximum area where a constant sound pressure can be ensured at least in the horizontal direction by the directional control. The marginal area specifies such an area on the camera image 30, and is predetermined.

The area comparison part 109 compares the target positions 32 designated by the target position designation part 101 with the marginal area, and outputs a result of the comparison to the user report part 110. On the basis of the result of the comparison by the area comparison part 109, the user report part 110 generates report data for making a user report, and outputs it to a monitor 22. For example, if a position outside the marginal area is designated as the target position 32, the user report part 110 displays on the monitor 22 a message indicating that the position is outside the marginal area.

<Area Setting Screen 40>

Figure 16:
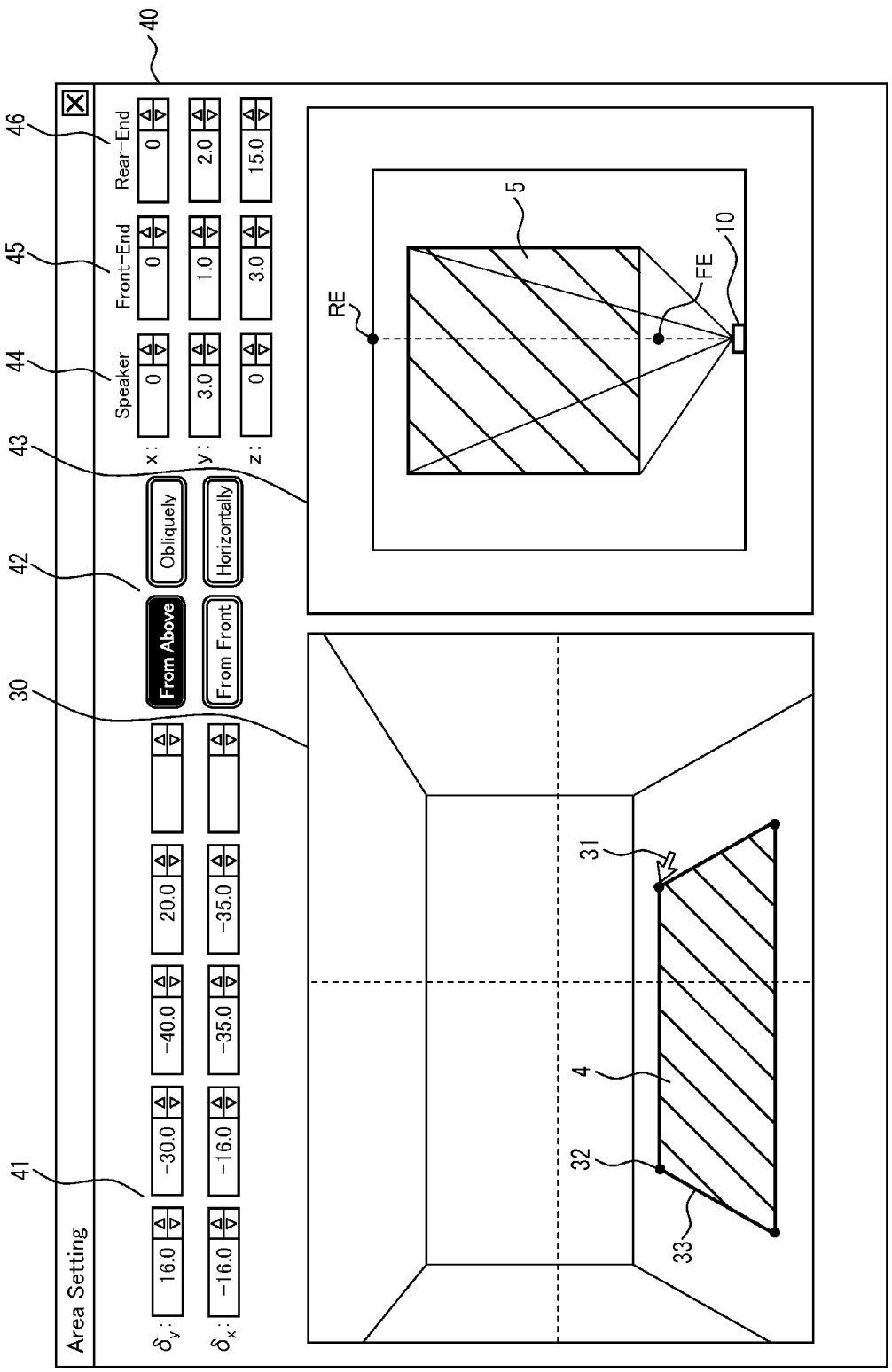
FIG. 16 is a diagram illustrating an example of an action during the generation of directional control parameters in the loudspeaker system 1 in FIG. 10, in which an area setting screen 40 displayed on the monitor 22 is illustrated.

FIG. 16 is a diagram illustrating an example of an action during the generation of the directional control parameters in the loudspeaker system 1 in FIG. 10, in which an area setting screen 40 displayed on the monitor 22 is illustrated. The area setting screen 40 is an operation screen for designating the target area 4 and the listening surface 7, and displayed on the basis of a user operation.

On the area setting screen 40, entry fields 41 for the target positions 32, viewpoint selection buttons 42 for 3D view, a 3D view display field 43, entry fields 44 for the attachment position of the speaker apparatus 10, and entry fields 45 and 46 for the front-end (FE) and rear-end (RE) of the listening surface 7 are provided, and on the lower side of the entry fields 41, the camera image 30 is displayed.

The entry fields 41 are operation areas for designating the target positions 32, in which the vertical deviation angles δx and the horizontal deviation angles δy indicating the positions on the camera image 30 can be entered, respectively. That is, the target positions 32 defining the target area 4 can also be designated by entering the deviation angles δx and δy in the entry fields 41. Also, in this example, four target positions 32 are designated, but five or more target positions 32 can also be designated.

In the 3D view display field 43, the positional relationship among the speaker apparatus 10, the listening surface 7, and the listening area 5 in the acoustic space is sterically displayed. The viewpoint selection buttons 42 are operation icons for selecting the attitude of the acoustic space to be displayed in the 3D view display field 43, and any of the viewpoints "From above", "Obliquely", "From front", and "Horizontally" can be selected. In this example, the viewpoint "From above" is selected, and in the 3D view display field 43, the speaker apparatus 10 and the listening area 5 in the acoustic space when viewed from above is displayed.

The entry fields 44 are operation areas for designating the attachment position of the speaker apparatus 10, in which x, y, and z coordinates indicating the position in the acoustic space can be entered. Here, a vertical line at the position of the camera 15 is assigned with a y axis, an intersection point between the y axis and the reference plane 6 with the origin, a straight line in the reference plane 6 parallel to the photography axis of the camera 15 with a z axis, and a straight line orthogonal to the y axis and the z axis with an x axis. That is, the y coordinate is a height from the reference plane 6, and the z coordinate is a horizontal distance from the speaker apparatus 10 in the photography axis direction.

The entry fields 45 are operation areas for designating the position of FE of the listening surface 7, in which x, y, and z coordinates in the acoustic space can be entered. The entry fields 46 are operation areas for designating the position of RE of the listening surface 7, in which x, y, and z coordinates in the acoustic space can be entered. The listening surface 7 can also be designated by designating the position of FE and the position of RE as the listening parameters.

On such an area setting screen 40, designating the target area 4 on the camera image 30, and designating the position of the speaker apparatus 10 and the positions of FE and RE of the listening surface 7 can obtain the listening area 5.

Figure 17:
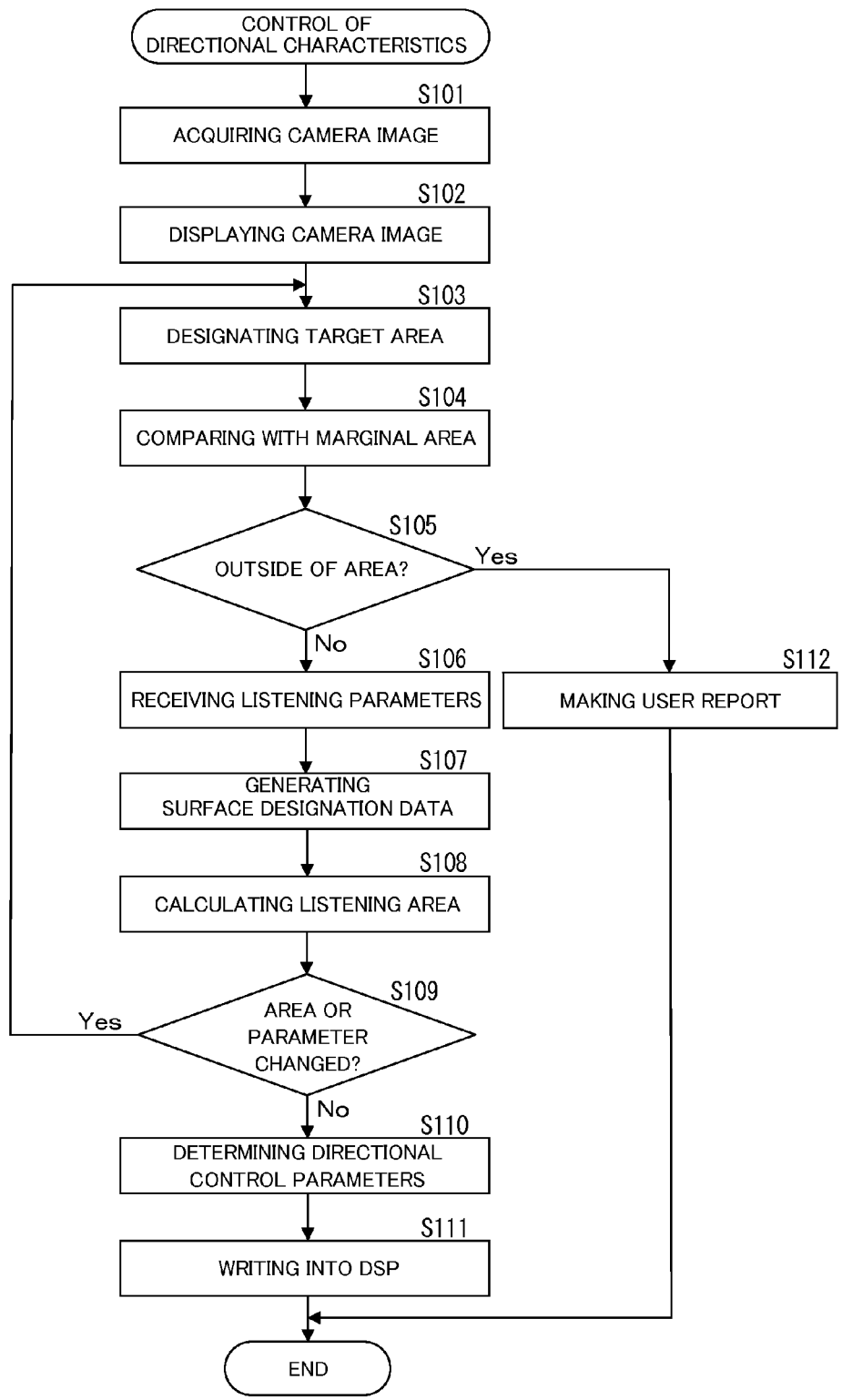
FIG. 17 is a flowchart illustrating an example of an action during the control of directional characteristics in the loudspeaker system 1 in FIG. 10.

Steps S101 to S112 in FIG. 17 represent a flowchart illustrating an example of an action during the control of directional characteristics in the loudspeaker system 1 in FIG. 10. First, the camera image acquisition part 21 acquires the camera image 30 from the speaker apparatus 10, and displays it on the monitor 22 (Steps S101 and S102).

Then, the directional control parameter generating part 24 designates the target positions 32 on the camera image 30 on the basis of user operations, and determines the target area 4 from the multiple target positions 32 to compare it with the marginal area (Steps S103 and S104). In so doing, if a position outside the marginal area is designated as any of the target positions 32, the directional control parameter generating part 24 makes the user report, and terminates this process (Steps S105 and S112).

Subsequently, the directional control parameter generating part 24 receives the listening parameters on the basis of user operations, and generates surface designation data defining the listening surface 7 (Steps S106 and S107). The directional control parameter generating part 24 obtains an area on the listening surface 7 corresponding to the target area 4 as the listening area 5 on the basis of the surface designation data (Step S108). The processing procedure from Step S103 to S108 is repeated every time the target area 4 or any of the listening parameters is changed (Step S109).

After that, on the basis of the obtained listening area 5, the directional control parameter generating part 24 determines the directional control parameters providing the directional characteristics of the speaker apparatus 10, and writes them in a DSP 14 of the speaker apparatus 10 to terminate this process (Steps S110 and S111).

According to the present embodiment, when a user designates the target area 4, an area on the listening surface 7 corresponding to the target area 4 is obtained as the listening area 5, and on the basis of the listening area 5, the directional control of the speaker apparatus 10 is performed. For this reason, the user can easily designate the listening target area where a predetermined sound pressure should be ensured, and perform the directional control of the speaker apparatus 10 appropriately for the listening target area. Also, since it is only necessary to designate the target area 4 on the camera image 30, the listening target area can be intuitively designated, and also the listening target area can be easily changed.

Further, by installing the speaker apparatus 10 in the acoustic space, and designating the target area 4 on the camera image 30 photographed by the camera 15, the listening target area can be designated in consideration of the actual position and direction of the speaker apparatus 10 in the acoustic space. Accordingly, the directional characteristics of the speaker apparatus 10 can be accurately fitted to the listening target area.

Still further, since the user report is made after the comparison between the predetermined marginal area and the target positions 32, if a position outside the marginal area is designated as any of the target positions 32, a user can be made to recognize that the position is outside the marginal area.

Note that in Embodiments 1 to 4, examples of the speaker apparatus 10 including the camera 15 having the angles of view wider than the maximum sound emitting angles of the speaker apparatus 10 are described; however, the present invention is not limited to such a configuration. For example, the camera 15 may be configured to have angles of view narrower than the maximum sound emitting angles of the speaker set 11 and a photographing direction adjustment mechanism adapted to move the photography axis.

<Dome Type Camera>

Figure 18:
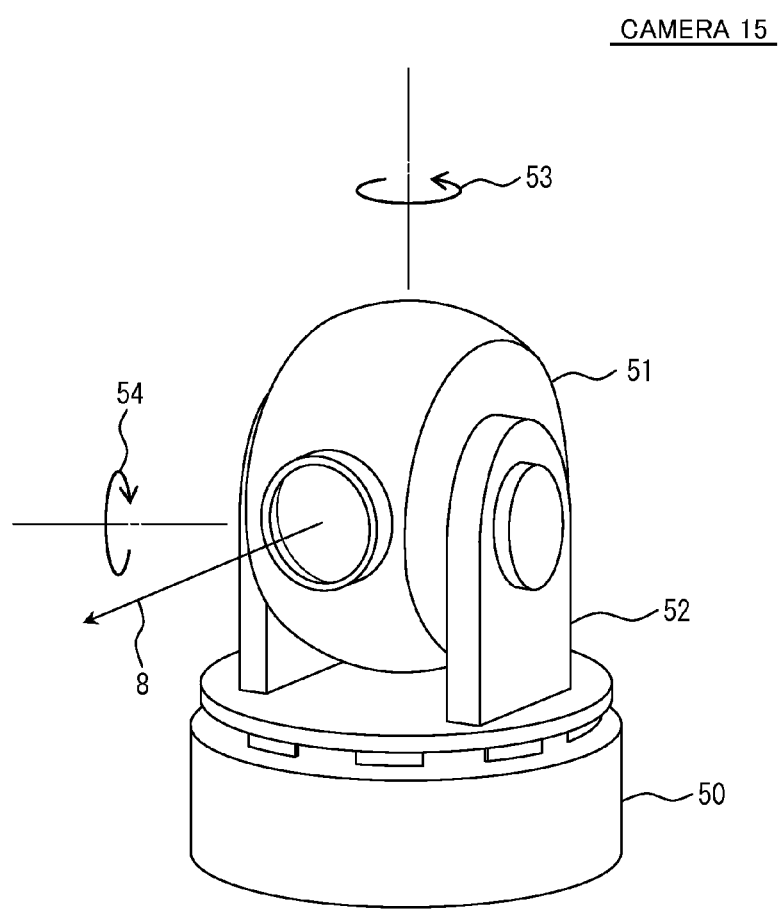
FIG. 18 is a perspective view illustrating another configuration example of the camera 15 disposed on the front panel 16a of the housing 16.

FIG. 18 is a perspective view illustrating another configuration example of the camera 15 disposed on the front panel 16a of the housing 16. This camera 15 is a dome type camera that has angles of view narrower than the vertical and horizontal maximum sound emitting angles and includes a photographing direction adjustment mechanism capable of vertically and horizontally moving a photography axis 8, and has a configuration similar to that of a monitor camera for monitoring, or the like.

The photographing direction adjustment mechanism is configured to include: a support part 52 that supports an imaging part 51 rotatably in a tilt direction 54; and a turntable part 50 that rotates the support part 52 in a pan direction 53. For example, the camera 15 is attached to the housing 16 such that a rotational axis in the pan direction 53 is perpendicular to the front panel 16a of the housing 16. The listening area calculation part 107 obtains the listening area 5 on the basis of the position of the target area 4 on the camera image 30 and a direction of the photography axis 8 at the time when the camera image 30 was photographed.

Such a configuration makes it possible to photograph any area within the maximum sound emitting angles as the camera image 30 even with the camera 15 having the angles of view narrower than the maximum sound emitting angles by moving the photography axis 8. Further, by obtaining the listening area 5 in consideration of the direction of the photography axis 8 at the time when the camera image 30 was photographed, any area within the maximum sound emitting angles can be appropriately designated as the listening area 5.

Also, in Embodiment 4, an example of the case where as an area on the predesignated listening surface 7, the listening area 5 is obtained is described; however, the present invention is not limited to such a configuration. For example, the present invention may be configured to obtain the listening area 5 by providing multiple cameras with photographing areas overlapping each other, and comparing a target area 4 on a camera image among the cameras to determine a distance to a listening point.

Specifically, first and second cameras of which photographing areas overlap each other are provided on the speaker apparatus 10 as the camera 15. The listening area calculation part 107 compares a target area 4 on a first camera image photographed by the first camera and a target area 4 on a second camera image photographed by the second camera, and determines a listening distance D to a listening point.

The listening point is a listening target point for defining a listening position in the acoustic space, and by comparing a position on the first camera image and a position on the second camera image, the listening distance D is obtained. For example, the listening distance D can be obtained by triangulation using the parallax between the first and second cameras. Such a configuration makes it possible to further facilitate the designation of the directional control parameters because the listening area 5 is obtained without designating the listening surface 7.

Also, another possible way to designate the listening area 5 is to install a microphone at the listening point, and analyze a sound collection signal from the microphone at the time when changing the directional characteristics of the speaker set 11 to specify an angle with and a distance to the microphone. Specifically, a sound collecting signal at the time when sequentially changing the sound emitting direction of the speaker set 11 is analyzed, and on the basis of a sound emitting direction in which maximum sound pressure was obtained, the angle with the microphone when viewed from the speaker apparatus 10 is determined. Also, the distance to the microphone is determined from the arrival time of the acoustic signal. On the basis of the angle with and distance to the microphone obtained in this manner, the listening area 5 is specified.

Further, in Embodiments 1 to 4, examples of the case where the directional control of the speaker set 11 is performed by adjusting the delay amount of the acoustic signal for each speaker unit 2 are described; however, the present invention is not limited to such a configuration. For example, the present invention may be configured to perform the directional control of the speaker apparatus 10 in the vertical direction on the basis of the delay amount adjustment, and perform the directional control in the horizontal direction on the basis of sound level adjustment.

To give a specific description, the directional control parameter determination part 104 makes the delay amount of the acoustic signal to be supplied to a speaker units 2 different depending on the vertical position of the speaker unit 2 as well as making a sound level different depending on the horizontal position of the speaker unit 2. For example, in the case of directing the sound emitting direction to the right of the front direction of the speaker apparatus 10, a sound level of a speaker unit 2 on the further left side when viewing the front panel 16a in the front direction is made larger.

Alternatively, a sound level of a speaker unit 2 on the left side when viewing the front panel 16a in the front direction is set to the same level as that of a center speaker unit 2, whereas a sound level of a speaker unit 2 on the right side is set to a soundless level. Such a configuration makes it possible to effectively control the vertical directional characteristics of the speaker set 11 by adjusting the delay amount of the acoustic signal as well as simply controlling the horizontal directional characteristics by adjusting the sound level of each speaker unit 2.

Further, in Embodiments 1 to 4, examples of the case where the directional control of the speaker apparatus 10 is performed on the basis of the phase control of each speaker unit 2 are described; however, the present invention does not limit the directional control of the speaker apparatus 10 to this. For example, the present invention can also be applied to a configuration where the directional control of the speaker apparatus 10 is performed by providing an angle adjustment mechanism adapted to adjust an attachment angle of each speaker unit 2, and controlling the direction of that speaker unit 2.

DESCRIPTION OF REFERENCE NUMERALS

1 loudspeaker system
10 speaker apparatus
11 speaker set
12 amplifier
13 digital/analog converter
14 DSP
15 camera
16 housing
16a front panel
20 PC
21 camera image acquisition part
22 monitor
23 operation part
24 directional control parameter generating part
30 camera image
32 target position
40 area setting screen
101 target position designation part
102 angle-of-view information storage part
103 directional control angle calculation part
104 directional control parameter determination part
105 target area determination part
106 listening surface designation part
107 listening area calculation part
108 marginal area storage part
109 area comparison part
110 user report part
2 speaker unit
3 phase adjustment part
4 target area
5 listening area
6 reference plane
7 listening plane

The invention claimed is:

1. A loudspeaker system comprising:
   a speaker set including two or more speaker units;
   a camera that photographs an acoustic space of said speaker set, and has a predetermined relative positional relationship with said speaker set;
   a display;
   an input; and
   a computing device configured to:
   display a camera image photographed by said camera, on said display;
   receive a user operation using said input through said camera image, said user operation including designation of one or more positions or a two-dimensional area on said camera image;
   on a basis of said user operation, designate one or more target positions on said camera image;
   on a basis of said one or more target positions, obtain one or more directional control angle with respect to a front direction of said speaker set; and
   on a basis of said directional control angle, perform directional control of said speaker set.

2. The loudspeaker system according to claim 1, wherein said computing device is configured to calculate deviation angle of said target position with respect to a photographing direction of said camera on a basis of said target position and an angle of view of said camera, and on a basis of the deviation angle, calculates said directional control angle.

3. The loudspeaker system according to claim 1, wherein:
   said computing device is configured to determine an area on said camera image on a basis of two or more positions on said camera image to specify a predetermined position in the area as a first target position, the two or more positions being designated by a user; and
   calculate a deviation angle of said first target position with respect to a photographing direction of said camera on a basis of said first target position and an angle of view of said camera, and on a basis of the deviation angle, calculates said directional control angle.

4. The loudspeaker system according to claim 3, wherein:
   said camera is arranged in a substantially same direction as the front direction of said speaker set; and said computing device is configured to specify a position in said area as said first target position, the position being farthest from a reference position on said camera image, the reference position being predetermined related to a position of said speaker set.

5. The loudspeaker system according to claim 4, wherein each of the speaker units of said speaker set is supplied with a common acoustic signal; and
said computing device is configured to determine a delay amount of said acoustic signal between adjacent speaker units on a basis of said directional control angle, and makes said delay amount uniform throughout the respective speaker units.

6. The loudspeaker system according to claim 1, wherein said computing device is configured to:
determine an area on said camera image on a basis of two or more positions on said camera image to specify a predetermined position in said area as a first target position, the two or more positions being designated by a user; specify a predetermined position different from said first target position in said area as a second target position;
calculate a first deviation angle of said first target position with respect to a photographing direction of said camera on a basis of said first target position and an angle of view of said camera to, on a basis of the first deviation angle, calculate a first directional control angle; calculate a second deviation angle of said second target position with respect to the photographing direction of said camera on a basis of said second target position and the angle of view of said camera to, on a basis of the second deviation angle, calculate a second directional control angle; and
perform the directional control of said speaker set on a basis of said first directional control angle and said second directional control angle.

7. The loudspeaker system according to claim 6, wherein:
said camera is arranged directed in a substantially same direction as the front direction of said speaker set; and
said computing device is configured to specify a position in said area as said first target position, the position being farthest from a reference position on said camera image, the reference position being predetermined related to a position of said speaker set, and specify a position in said area as said second target position, the position being closest to said reference position.

8. The loudspeaker system according to claim 7, wherein each of the speaker units of said speaker set is supplied with a common acoustic signal; and
said computing device is configured to: determine a first delay amount of said acoustic signal between a first speaker unit arranged at one end of an array and its adjacent speaker unit on a basis of said first directional control angle; determine a second delay amount of said acoustic signal between a second speaker unit arranged at another end of said array and its adjacent speaker unit on a basis of said second directional control angle; and for speaker units between said first speaker unit and said second speaker unit, determine delay amounts of said acoustic signal by an interpolation operation based on said first delay amount and said second delay amount.

9. The loudspeaker system according to claim 1,
wherein said computing device is configured to: designate a listening surface in said acoustic space;
on a basis of said two or more target positions, determine a target area that is an area on said camera image;
obtain an area on said listening surface as a listening area, the area corresponding to said target area; and
perform the directional control of said speaker set on a basis of said listening area.

10. The loudspeaker system according to claim 9, wherein said computing device is configured to designate said listening surface relatively to a reference plane that is predetermined with said camera as a reference.

11. The loudspeaker system according to claim 9, wherein:
said two or more speaker units included in said speaker set are two-dimensionally arranged on a front panel of a housing; and
said computing device is configured to perform phase control of said speaker units so as to make sound pressure substantially constant at least on a boundary line of said listening area.

12. The loudspeaker system according to claim 1, wherein:
said two or more speaker units are disposed on a front panel of a housing in a state of being directed in a substantially same direction; and
said camera is disposed on said front panel in a state of being directed in a substantially same direction as the front direction of said speaker set.

13. The loudspeaker system according to claim 9, wherein:
said camera has an angle of view narrower than a maximum sound emitting angle of said speaker set, and a photographing direction adjustment mechanism adapted to move a photography axis; and
said computing device is configured to obtain said listening area on a basis of said target area and a direction of said photography axis.

14. The loudspeaker system according to claim 1,
wherein said computing device is configured to retain a marginal area designatable as said target position;
compare the target positions with said marginal area; and
make a user report on a basis of a result of the comparison.

15. The loudspeaker system according to claim 1, further comprising a digital signal processor (DSP) configured to adjust delay amount of an acoustic signal supplied to each of the speaker units of said speaker set on a basis of directional control parameters, wherein said performing directional control of said speaker set includes generating said directional control parameters on a basis of said one or more directional control angles to write the generated directional control parameters in the DSP.

16. A loudspeaker, comprising:
a speaker set including two or more speaker units;
a camera that photographs an acoustic space of said speaker set to generate a corresponding camera image, and has a predetermined relative positional relationship with said speaker set; and
a processor configured to adjust delay amount of an acoustic signal supplied to each of the speaker units of said speaker set on a basis of directional control parameters to perform directional control of said speaker set, said directional control parameters being generated by an external computing device on a basis of one or more directional control angles, said one or more directional control angles being obtained by said external computing device with respect to a front direction of said speaker set on a basis of one or more target positions, said one or more target positions being designated by said external computing device on said camera image on a basis of a user operation including designation of one or more positions or a two-dimensional area on said camera image displayed on a display coupled to said external computing device.

17. A method for performing directional control of a speaker set having two or more speaker units, said method comprising:

displaying, on a display, a camera image photographed by a camera that is so arranged as to have a predetermined relative positional relationship with said speaker set;

in response to a user operation via said camera image to designate one or more positions or a two-dimensional area on said camera image, designating one or more target positions on a basis of said user operation;

on a basis of said one or more target positions, obtaining one or more directional control angle with respect to a front direction of said speaker set; and on a basis of said directional control angle, performing directional control of said speaker set.

\* \* \* \* \*